United States Patent
Palmer et al.

(10) Patent No.: US 10,700,623 B2
(45) Date of Patent: Jun. 30, 2020

(54) POSITIONING DRIVE AND METHOD FOR POSITIONING AN OUTPUT ELEMENT

(71) Applicant: EGT EPPINGER GETRIEBE TECHNOLOGIE GMBH, Denkendorf (DE)

(72) Inventors: Thomas Palmer, Plüderhausen (DE); Uwe Eppinger, Stuttgart (DE)

(73) Assignee: EGT EPPINGER GETRIEBE TECHNOLOGIE GMBH, Denkendorf (DE)

( * ) Notice: Subject to any disclaimer, the term of this patent is extended or adjusted under 35 U.S.C. 154(b) by 121 days.

(21) Appl. No.: 15/573,799

(22) PCT Filed: May 11, 2016

(86) PCT No.: PCT/EP2016/060581
§ 371 (c)(1),
(2) Date: Nov. 13, 2017

(87) PCT Pub. No.: WO2016/180890
PCT Pub. Date: Nov. 17, 2016

(65) Prior Publication Data
US 2018/0109214 A1    Apr. 19, 2018

(30) Foreign Application Priority Data
May 13, 2015   (DE) .................. 10 2015 107 583

(51) Int. Cl.
*F16H 55/18* (2006.01)
*H02P 8/40* (2006.01)
(Continued)

(52) U.S. Cl.
CPC ............... *H02P 8/40* (2013.01); *F16H 55/18* (2013.01); *F16H 57/12* (2013.01); *H02P 5/485* (2016.02); *G05B 19/404* (2013.01); *H02P 8/22* (2013.01)

(58) Field of Classification Search
CPC .......... F16H 55/18; F16H 57/12; H02P 5/485; H02P 8/22; H02P 8/40
See application file for complete search history.

(56) References Cited

U.S. PATENT DOCUMENTS

| 5,704,250 A | 1/1998 | Black | |
| 8,089,226 B2 * | 1/2012 | Matsutani | B23P 19/066 318/105 |

(Continued)

FOREIGN PATENT DOCUMENTS

| CN | 1637327 A | 7/2005 |
| DE | 1290232 A | 3/1969 |

(Continued)

OTHER PUBLICATIONS

Sorin Manea: "AN1307, Stepper Motor Control with dsPIC(R) DSCs", Microchip AN1307, Microchip Technology Inc, Mar. 26, 2009, pp. DS01307A-1, XP002730008, Retrieved from the Internet: UR:" http://www.microchip.com/stellent/groups/techpub_sg/documents/appnotes/en546027.pdf.

(Continued)

*Primary Examiner* — Edwin A Young
(74) *Attorney, Agent, or Firm* — Fitch, Even, Tabin & Flannery LLP

(57) ABSTRACT

A positioning drive has a first stepper drive unit having a first stepper drive controller and a first stepper motor, and a second stepper drive unit having a second stepper drive controller and a second stepper drive. The two stepper drives and the power take-off element are force-coupled and drive-coupled by a mechanical coupling unit. A central unit (Continued)

controls the two stepper drive controllers by a control signal, in each instance. The control signals predetermine the stator reference field angle and the rotor reference field angle set by the stepper drive controller. The central unit has an overriding regulator for the position of the power take-off element, and a subordinate regulator for setting a tensioning moment for each stepper motor. The tensioning moments occur by setting a load actual angle at the stepper drive.

24 Claims, 7 Drawing Sheets

(51) Int. Cl.
    *H02P 5/485* (2016.01)
    *F16H 57/12* (2006.01)
    *G05B 19/404* (2006.01)
    *H02P 8/22* (2006.01)

(56) References Cited

U.S. PATENT DOCUMENTS

| | | |
|---|---|---|
| 2005/0139035 A1 | 6/2005 | Lee et al. |
| 2006/0060026 A1* | 3/2006 | Hawkes ............... F16H 55/24 74/661 |
| 2009/0237026 A1 | 9/2009 | Panaitescu et al. |

FOREIGN PATENT DOCUMENTS

| | | |
|---|---|---|
| DE | 2539436 A1 | 3/1977 |
| DE | 279432 A1 | 6/1990 |
| DE | 4329057 C1 | 9/1994 |
| DE | 10010962 A1 | 9/2001 |
| EP | 0799672 A1 | 10/1997 |
| EP | 0888504 A1 | 1/1999 |
| EP | 2372476 A1 | 10/2011 |
| EP | 2818419 A1 | 12/2014 |
| JP | H10105244 A | 4/1998 |
| TW | 200627107 A | 8/2006 |

OTHER PUBLICATIONS

International Search Report in International Application No. PCT/EP2016/060581, dated Jul. 28, 2016, 7 pages.

Office Action in corresponding German Application No. DE 10 2015 107 583.0, dated May 13, 2015, 15 pages.

Chinese Search Report dated Nov. 5, 2019 and First Office Action dated Nov. 15, 2019, in corresponding Chinese Application No. 201680027401.3, with English translation (19 pages).

Taiwanese Office Action and Search Report dated Apr. 8, 2020, in corresponding Taiwanese Application No. 10920271590, with English translation (18 pages).

\* cited by examiner

POSITIONING DRIVE AND METHOD FOR POSITIONING AN OUTPUT ELEMENT

CROSS REFERENCE TO RELATED APPLICATIONS

This patent application is the national phase of PCT/EP2016/060581 filed May 11, 2016, which claims the benefit of German Patent Application No. 10 2015 107 583.0 filed May 13, 2015.

TECHNICAL FIELD

The invention relates to a positioning drive and to a method for positioning of a power take-off element. The power take-off element can be driven in linear or rotational manner. For example, it can be a table or carriage for a tool, or a tool, which can be driven in translational or rotational manner.

BACKGROUND

In many applications, it must be possible to position power take-off elements, which are moved by a positioning drive, very precisely, for example tables or carriages of machine tools or measurement machines, in order to obtain correspondingly great precision in machining or measuring or testing of a work piece. In the production of such a positioning drive, the movement-transferring mechanism demonstrates elasticity, production tolerances, friction, and play or slack. On the basis of these insufficiencies, imprecisions or errors can come about in the positioning of the power take-off element.

The play in the mechanical transfer within the positioning drive all the way to the power take-off element can furthermore lead to a delayed movement of the power take-off element if a positioning motor that is being controlled must first overcome the play before its movement is transferred to the power take-off element. In the case of highly dynamic applications, problems or errors can occur during positioning, such as, for example, oscillations or overshooting behavior, which make it necessary to reduce the amplification and thereby the dynamics of the position regulator.

It is therefore desirable to eliminate the play in the kinematic transfer chain from a positioning motor all the way to the power take-off element.

In order to solve this problem, it is known to eliminate a play in the kinematic transfer chain by means of elastic preload elements. It is disadvantageous, in this regard, that the preload force of a mechanical preload element acts at every point in time, and this has a negative influence on the efficiency of the positioning drive. Devices for being able to optionally activate and deactivate such a mechanical preload element are complicated in terms of design and require additional actuators.

In order to avoid the disadvantages of a mechanical preload element, it is also known to drive a power take-off element by means of a positioning drive having two servomotors, to which a moment for preload of the mechanical system can be applied, one against the other. Such a positioning drive is known, for example, from DD 279432 A1. There, two servomotors are operated, regulated with a control loop, which has an overriding position control loop. A speed of rotation control loop is subordinated to the position control loop, and, in turn, a current control loop is subordinated to the speed of rotation control loop. In the case of servomotors having field-oriented current regulation, the motor moment can be changed by means of influencing the torque-forming motor current (armature transverse current), which moment behaves proportional to the motor current. Accordingly, a tensioning reference value transducer is additionally present, which modifies the reference values for the motor currents of the two servomotors in such a manner that these each maintain a motor moment that is directed opposite the other. As a result, the mechanical system is tensioned and the power take-off element can be positioned without play and precisely.

Proceeding from this, it can be seen as the task of the present invention to create a positioning drive as well as a method, which can be implemented with simpler means.

SUMMARY

The positioning drive according to the invention has a mechanical coupling unit. The mechanical coupling unit has a coupling output that is connected with the power take-off element. The coupling unit furthermore has two coupling inputs coupled with the coupling output. A position change at one of the coupling inputs therefore leads to a position change of the power take-off element at the coupling output. Preferably, a force coupling or moment coupling between the two coupling inputs is also present, which can thereby reciprocally influence one another. In particular, the coupling unit is structured in such a manner that a movement at the coupling output—ignoring the existing elasticity—is only possible if all the coupling inputs move, as well. A gear step-up or gear step-down is present between the coupling inputs and the coupling output, in each instance; these can be the same or different in size. A gear translation of 1:1 between the coupling inputs and the coupling output is also possible.

The positioning drive furthermore has a first stepper drive unit having a first stepper motor and a first stepper drive controller that controls this first stepper motor. Accordingly, a second stepper drive unit has a second stepper motor and a second stepper drive controller that controls this second stepper motor. The two rotors of the stepper motors are directly connected with an assigned coupling input of the coupling unit, in each instance.

The positioning drive furthermore has a central unit to which a kinematic reference value and a tensioning reference value are applied. The kinematic reference value can be a position reference value, a speed reference value or an acceleration reference value. In the case of positioning tasks, a position reference value is used as the kinematic reference value. For applications in which the advance along a track curve is supposed to be regulated, a speed reference value can also be set. The kinematic reference value and the tensioning reference value can be set by a machine controller, for example, as a function of the application, and transmitted to the central unit. In the case of a machine controller that does not provide an output for a tensioning reference value, the central unit can also determine a tensioning reference value on the basis of a predetermined tensioning strategy.

The central unit is set up for determining a first control signal for the first stepper drive controller and a second control signal for the second stepper drive controller, as a function of the kinematic reference value and the tensioning reference value. The control signals indicate, in each instance, in what direction and by what amount or by what number of steps the rotor of a stepper motor in question is to be moved. The control signals therefore define position changes for the rotors.

By way of the two control signals, on the basis of the kinematic coupling of the drive units and of the output element, an overdetermined position change default is brought about, according to the invention, something that is otherwise avoided in regulation technology.

Usually, the kinematic overdetermination is avoided in that only one servomotor works in position-regulated manner, and the other servomotor is torque-regulated. What is called master-slave operation is carried out. However, the torque-regulated operating mode of a servomotor (for example of a synchronous motor) requires field-oriented current regulation and the possibility of setting a torque-forming armature transverse current by way of a control signal.

In the invention, no motor current or armature transverse current or any other variable that directly determines the motor moment can be set for the stepper drive controllers by way of the control signal. The control signals are determined by the central unit in such a manner that load moments directed in opposite directions occur in the stepper motors when the predetermined reference position is set in the two stepper motors. When the stepper drive controllers control the assigned stepper drive, in each instance, using the control signals, and move them by the predetermined number of steps, in the predetermined direction, a tensioning state occurs in the coupling unit, so that any possible play is eliminated.

Therefore, according to the invention, stepper drive units can be used for setting the position of the power take-off element, which units have no possibility for setting a torque reference value. By means of an overdetermined kinematic default, preferably an overriding position or speed or acceleration default, the position of the power take-off element is controlled or regulated, for example in an overriding control loop. The other degree of freedom that occurs as the result of coupling of multiple drive units (inputs) with an output is used to set a load angle and thereby a tensioning moment in the two stepper motors, in order to eliminate the play in the coupling unit. The load angle is the difference between a stator field angle and a rotor field angle.

More than one power take-off element can also be present. Each power take-off element has at least two stepper motor units assigned to it. The coupling unit can accordingly have many coupling inputs and coupling outputs. It is also possible to provide a separate coupling unit for each power take-off element.

Preferably, two stepper motor units are assigned to each drive element. Fundamentally, it is sufficient, in order to achieve freedom from play, if the number of the stepper motor units is one greater than the number of the power take-off elements, as long as all the power take-off elements and stepper motor units are kinematically coupled.

Permanent-magnet stepper motors and/or reluctance stepper motors and/or hybrid stepper motors can be used as stepper motors, which are structured with at least 2 phases. For simplification of control or regulation, it is advantageous if only stepper motors of the same type, or, further preferably, identical stepper motors are used as stepper motors.

The positioning drive can use linear or rotational stepper motors or synchronous motors. In general, stepper motors that have a stator element, by way of which the stator field of rotation can be controlled or regulated in terms of its intensity and phasing, and which furthermore have a movable rotor element that can follow the stator field of rotation, can be used as stepper motors. Servomotors and brushless direct-current motors are generally based on the synchronous motor principle (like stepper motors). In contrast to a field-oriented servo current regulation, however, according to the invention, it is specifically not the working point at which the armature transverse component of the armature current has the greatest proportion that is set, but rather, an armature longitudinal current component is always also present. In contrast to operation of brushless direct-current motors with electronic commutation, according to the invention setting of the stator field angle as a function of the load angle default takes place, not switching merely as a function of the rotor field actual angle.

The stepper motors can preferably always be operated in micro-step operation, thereby causing the adjustability of the stator field reference angle to occur with high resolution and great precision.

In an exemplary embodiment, the stator field is generated and moved by means of control of the stator windings. Alternatively to this, it is also possible to provide a permanent-magnet arrangement, in which the stator field angle is set by means of a mechanical movement of the permanent-magnet arrangement.

Each control signal can preferably describe a stator field reference angle and/or a rotor field reference angle, and optionally, in addition, a stator field intensity amount for each stepper motor. The stator field intensity amount can be predetermined, in some exemplary embodiments, by way of a current amplitude default, independent of the control signal, and set in fixed manner, for example.

A stepper signal for the stepper motor, which sets the stator field actual angle in accordance with the predetermined stator field reference angle or rotor field reference angle, is generated from the control signal by way of the respective stepper drive controller. A stepper signal for the stepper motor can be generated from the control signal by way of the respective stepper drive controller, by means of corresponding current impression in the stator field windings. In this regard, the control signal indicates the stator field reference angle and the stepper signal corresponds, for example, to the impressed currents in the stator field windings for the stepper motor and thereby to the stator field actual angle.

In this regard, the stator field actual angle can trail the stator field reference angle—as a function of the dynamics of the current regulation of the stepper drive controller—so that a phase shift occurs. In some exemplary embodiments, the dynamics can be described, by approximation, as a delay element of the first order, wherein the time constant of this delay generally lies in a range from one to five milliseconds. For many practical application cases, for example in the positioning of inert masses, this delay can be ignored, and the stator field actual angle can be equated with the stator field reference angle in simplifying manner. In the invention, however, this delay can also be fundamentally taken into consideration, in that the stepper drive controller correspondingly provides leading stator field reference angle defaults by way of the control signal in question. According to the invention, the rotor and thereby the rotor field actual angle does not follow the stator field actual angle (or the stator field reference angle) if a tensioning state exists, on the basis of the kinematic coupling and the force coupling or moment coupling of the drive units with one another. In this regard, a load angle is generated in each stepper motor, which angle is dependent on the rotor field actual angle and the stator field actual angle. The load angles of the two stepper motors are directed against one another, in terms of their sign or amount, in such a manner that a force equilibrium exists at the power take-off element, by means of the tensioning, in the reference position of the power take-off element.

Preferably, each stepper drive controller is set up for determining a string current for each stator phase of the assigned stepper motor, independent of the received control signal or the stator field reference angle described by the control signal. In this regard, the current amplitude value for the string currents of a stepper motor or for the phase currents of all the stepper motors can be predetermined, and, in particular, can be predetermined to be constant. In a preferred exemplary embodiment, the current amplitude value is not varied in the positioning of the power take-off element.

It is furthermore advantageous if the central unit is set up for predetermining control signals in the tensioning state, in such a manner that the power take-off element performs a sub-step position change with a position change amount that is smaller than the position change amount that the power take-off element can perform outside of the tensioning state, by means of the stepper drive units. In this regard, each stepper drive unit is preferably set up for performing full steps and/or half steps and/or micro-steps. In the tensioning state, sub-step position changes are possible, in this regard, which are smaller than a micro-step of each stepper drive unit that can be performed. The sub-step position change in the tensioning state could therefore also be referred to as a "nano-step."

In a preferred exemplary embodiment of the invention, the sub-step position change in the tensioning state can be achieved by means of the force coupling or moment coupling of the drive units. During adjustment of the stator field actual angles of only one stepper drive unit, the other stepper drive unit will prevent rotation of the power take-off element by the full step amount, and, instead, will increase both its own load angle and that of the other stepper drive unit. In a kinematic gear translation of the stepper drive units of 1:1 relative to one another and with the same design, the power take-off element will move precisely by half a micro-step in this regard. Only when the other stepper drive unit, in each instance, is also moved further by a micro-step will the power take-off element also be rotated further by the full amount, and the load angles of the two stepper drive units will be reduced again. Thereby, sub-position changes [Translator's Note: "Sub-Positionsänderungen" probably should be "Subschritt-Positionsänderungen"=sub-step position changes] in the sub-micro-step range can be achieved by means of the alternating step sequence, which can be referred to as a "nano-step."

To carry out a sub-step position change, the stator field actual angle for the stepper drives can be changed alternately, particularly alternately by the smallest possible angle amount that the two stepper drive units allow.

Furthermore, it is also possible to further increase the sub-step position change or the sub-micro-step resolution even further, in that the low-pass behavior on the basis of mass inertias or the delayed dynamics of the current control loop of the stepper drive controller is utilized. In this regard, the central unit generates pulse-width-modulated stepper signals, which bring about the result that the stepper drive unit moves, for example, not just by half a micro-step, but rather even less, in accordance with the sampling ratio of the pulse-width modulation. In this regard, the frequency of the pulse-width modulation is preferably selected to be sufficiently high, for example at least 10 kHz, thereby ensuring, on the basis of the aforementioned low-pass behavior of the inert masses, that no disruptive oscillations occur at the power take-off element.

It is furthermore preferred if the stepper motors, in the tensioning state, have a load angle, in each instance, that results from the difference between a stator field actual angle and a rotor field actual angle.

It is preferred if the rotor actual angle of each stepper motor is determined, for example by means of a measurement using a sensor, by means of a calculation method or by means of an estimate. The rotor field actual angle can be determined from the rotor actual angle and the number of pole pairs of the stepper motor.

It is furthermore preferred if the load angle corresponds at most to a maximal load angle, depending on the type of the stepper motor. The maximal load angle is predetermined in such a manner that the load moment increases with an increase, in terms of amount, of the load angle up to the maximal load angle. The maximal load angle can amount, in the case of a permanent-magnet stepper motor, to electrically 90°, or, in the case of a reluctance stepper motor, to electrically 45°, and, in the case of a hybrid stepper motor, can lie in the range of electrically 45° to 90°. The position of the maximal load angle furthermore depends on the pole and groove geometry of the stator and rotor.

In a preferred embodiment, the coupling unit is structured without a self-locking effect.

It is furthermore advantageous if a sensor unit having at least one position sensor is present. By way of one or more position sensors, it is possible to implement regulation. For example, the load angle of each stepper motor can be regulated in a subordinate control loop. It is furthermore preferred if a position sensor generates a sensor signal that describes the position of the power take-off element and/or the position change of the power take-off element. In this manner, the position of the power take-off element can be regulated. In particular, this position regulation is implemented in an overriding control loop, while all the other regulators or controllers are structured in subordinate regulation or control loops.

Preferably, position values can be measured, estimated or calculated by way of one or more position sensors, particularly for the power take-off element. Furthermore, the rotor field actual values of the stepper drive units can be measured, estimated or calculated. Using the rotor field actual values of the stepper drive units, it is particularly possible to calculate or estimate the load angle actual values. In this regard, it can be assumed, ignoring the dynamics of the current regulator, that the stator field actual values correspond to the stator field reference values. In this manner, the position or the speed or the acceleration of the power take-off element as well as the load angle of stepper drive units can be regulated.

If the rotor field actual angles are not measured, a load angle can nevertheless be controlled, under the assumption of a constant gear mechanism play, for example. The controlling method can be improved, if, for example, a gear mechanism play characteristic line is determined and recorded.

The manipulated variables in the controlling and/or the regulating positioning drive or method are, in particular, the stator field reference angles, which are transmitted to the stepper drive controller units in the form of the control signals in question, for example as clock pulses and/or direction pulses.

Preferably, the central unit is set up for processing the at least one sensor signal of the at least one position sensor of the sensor unit, and, in this regard, for generating additional virtual signals, by way of predetermined models and/or data and/or information, which signals can improve the control or the regulation. For example, for this purpose a Luenberger observer, a Kalman filter, a translation characteristic field or the like can be used. Elasticity values and transmission errors, as well as friction effects in kinematic couplings can also be taken into consideration. Furthermore, the dynamics of the current control loop or dynamic properties of the regulation segment can be taken into consideration or compensated. A combination of several of the aforementioned possibilities can also be used.

In addition, it is also possible to use identification methods, for example in order to determine or estimate the current stress conditions—such as, for example, the masses to be moved or the mass inertias—and to adapt the controller or the regulator to that. In this way, adaptive methods or learning methods or devices can be implemented, for example. The possibility also exists of measuring or determining disruptions, and of determining them by means of model-supported devices or method, for example using interference observers. In this way, interference variable compensations can be implemented, for example, and the positioning behavior of the positioning drive can be improved.

BRIEF DESCRIPTION OF THE DRAWINGS

Advantageous embodiments of the invention are evident from the dependent claims, the description, and the drawing. Below, preferred exemplary embodiments of the invention are described in detail, using the attached drawings. These show:

DETAILED DESCRIPTION

Figure 1:
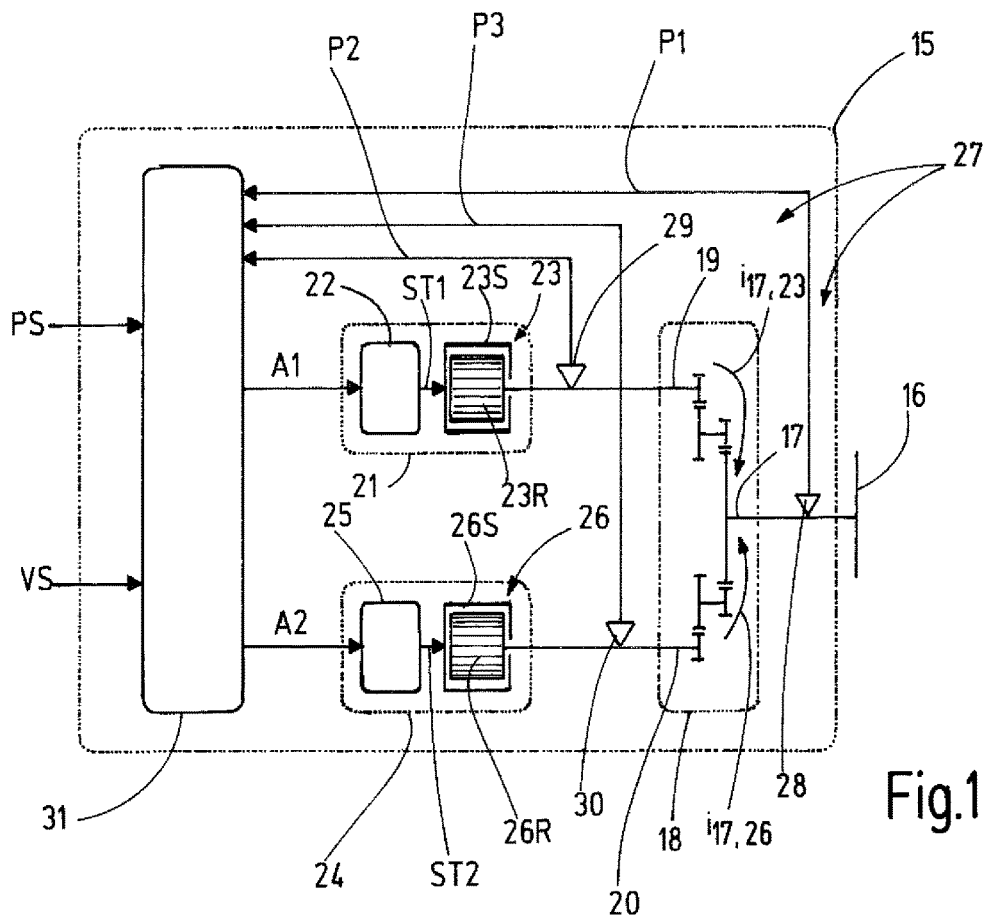
FIG. 1 a block schematic of a first exemplary embodiment of a positioning drive having two stepper drive units and a central unit, FIG. 2 a block schematic of an exemplary embodiment of the central unit of the positioning drive from FIG. 1, FIG. 2a a block schematic of an exemplary embodiment of a position control loop and of a tensioning default block of the central unit from FIG. 2, FIG. 2b a block schematic of an exemplary embodiment of a method block for regulation of a load angle, FIG. 3 a schematic representation of a stepper motor of a stepper drive unit from FIG. 1, FIG. 4 a schematic diagram regarding the production of a tensioning state, FIGS. 5 to 7, in each instance, a block schematic of a further exemplary embodiment of a positioning drive, and FIGS. 8 and 9, in each instance, a schematic time progression, as an example, for the stator field actual angle of the two stepper motors, and a resulting rotor field actual angle for the two stepper motors.

FIG. 1 shows an exemplary embodiment of a positioning drive 15 in the form of a block schematic. The positioning drive 15 serves for moving or positioning of a power take-off element 16. The power take-off element 16 can be, for example, a table or a carriage for positioning or for regulation of the movement or of the advance of a tool or of a work piece. The power take-off element 16 can be driven in rotational or translational manner.

The power take-off element 16 is connected with a coupling output 17 of a mechanical coupling unit 18. The coupling unit 18 is structured, for example, as a gear mechanism, e.g. as a spur gear mechanism or another gear wheel mechanism. It has a first coupling input 19 and a second coupling input 20. Each coupling input 19, 20 is force-coupled with the coupling output 17. Furthermore, in the exemplary embodiment, the two coupling inputs 19, 20 are also force-coupled with one another. As a result, a movement at the coupling output 17, independent of one of the two coupling inputs 19, 20, is not possible.

The positioning drive 15 has a first stepper drive unit 21 having a first stepper drive controller 22 and a first stepper motor 23. The first stepper drive controller 22 generates a first stepper signal ST1 for the first stepper motor 23. The first stepper motor 23 has a stator 23S and a rotor 23R. The rotor 23R is connected with the first coupling input 19.

Analogous to the first stepper drive unit 21, a second stepper drive unit 24 having a second stepper drive controller 25 and a second stepper motor 26 is furthermore present. The second stepper drive controller 25 generates a second stepper signal ST2 for the second stepper motor 26. The second stepper motor 26 has a stator 26S and a rotor 26R, which is connected with the second coupling input 20.

The positioning drive 15 furthermore has a sensor unit 27, which has at least one position sensor. In the exemplary embodiment, a first position sensor 28 is present, which generates a first position signal P1 that describes the position and/or the position change of the power take-off element 16. For example, the first position sensor 28 can be implemented by means of an angle sensor or a different position sensor that measures the current absolute position of the power take-off element 16 and generates a corresponding first position signal P1.

In the exemplary embodiment described here, the sensor unit 27 furthermore has a second position sensor 29 as well as a third position sensor 30. The second and the third position sensor 29, 30 are each assigned to a rotor 23R and 26R, respectively, of a stepper motor and detect its rotational position. The second or third position sensor 29, 30 can be structured as an encoder, for example, and generate a second position signal P2 and a third position signal P3, which describe the rotor actual angle $\varphi_{R23,ist}$ and $\varphi_{R26,ist}$ of the related rotors 23R and 26R, respectively. The second and the third position sensor 29, 30 are optional and serve to perform a subordinate regulation for a respective load angle $\lambda_{23}$ of the first stepper motor 23 and a load angle $\lambda_{26}$ of the second stepper motor 26. The load angle $\lambda_{23}$ or $\lambda_{26}$ of each stepper motor 23 or 26 results from the difference between a stator field actual angle $\rho_{Si,ist}$ and the rotor field actual angle $\rho_{Ri,ist}$. For the index i, the value i=23 relates to the first stepper motor 23, in each instance, and the index i=26 relates to the second stepper motor 26, in each instance. The stator field actual angle $\rho_{Si,ist}$ is determined from the known stator field reference angle $\rho_{Si,soll}$, and the rotor field actual angle $\rho_{Ri,ist}$ is determined from the rotor position information of the position signals P2 and P3. Using the first position sensor 28, overriding regulation for the position of the power take-off element 16 is carried out.

In the exemplary embodiment described here, position signals of position sensors are used. Alternatively to this, it is also possible to estimate or calculate the position. For example, a defined starting situation can be produced within the scope of initialization, for example by means of movement against a stop. Proceeding from this starting situation, the stator field changes or stepper pulses can be counted. Based on the information of the transfer factors as well as the numbers of pole pairs of the stepper motors 23, 26, the respective position can then be calculated. This method can optionally be further improved in that gear mechanism play characteristic lines or transfer characteristic lines of the kinematic segment and, if applicable, elasticity values in the kinematic transfer segment are determined and taken into consideration.

The at least one position signal and the three position signals P1, P2, P3, for example, of the sensor unit 27 are transmitted to a central unit 31. The central unit 31 furthermore receives a kinematic reference value, which here is formed by a position reference value PS, as well as a tensioning reference value VS. The position reference value PS defines the reference position of the power take-off element 16, and the tensioning reference value VS describes a mechanical tensioning that is supposed to be applied by the two stepper drive units 21, 24 to the coupling inputs 19, 20 of the coupling unit 18. By means of the tensioning, a play in the mechanical transfer between the coupling inputs 19, 20 and the coupling output 17 and therefore in the kinematic chain between the two rotors 23R, 26R and the power take-off element 16, in particular, can be eliminated. Once the tensioning state has been produced, any existing play is at least reduced, and ideally, it is completely eliminated.

In deviation from the exemplary embodiment described here, a movement default for the power take-off element 16 can also be used as a kinematic reference value here, for example a speed and/or an acceleration and/or a jolt. As a result, an advancing movement, for example, can be controlled or regulated.

Provision of a tensioning reference value is optional. In the central unit 31, a tensioning reference value and thereby a tensioning moment can be determined using a predetermined tensioning strategy or on the basis of empirical values or of a characteristic field, or on the basis of further parameters such as, for example, the speed of rotation of the power take-off element. It is also possible not to provide a tensioning reference value to the central unit 31, but rather to provide a fuzzy reference value such as, for example, "off," "weak," "strong" or the like. The tensioning reference value can also be determined in the central unit 31, as described, on the basis of such fuzzy reference values.

Figure 4:
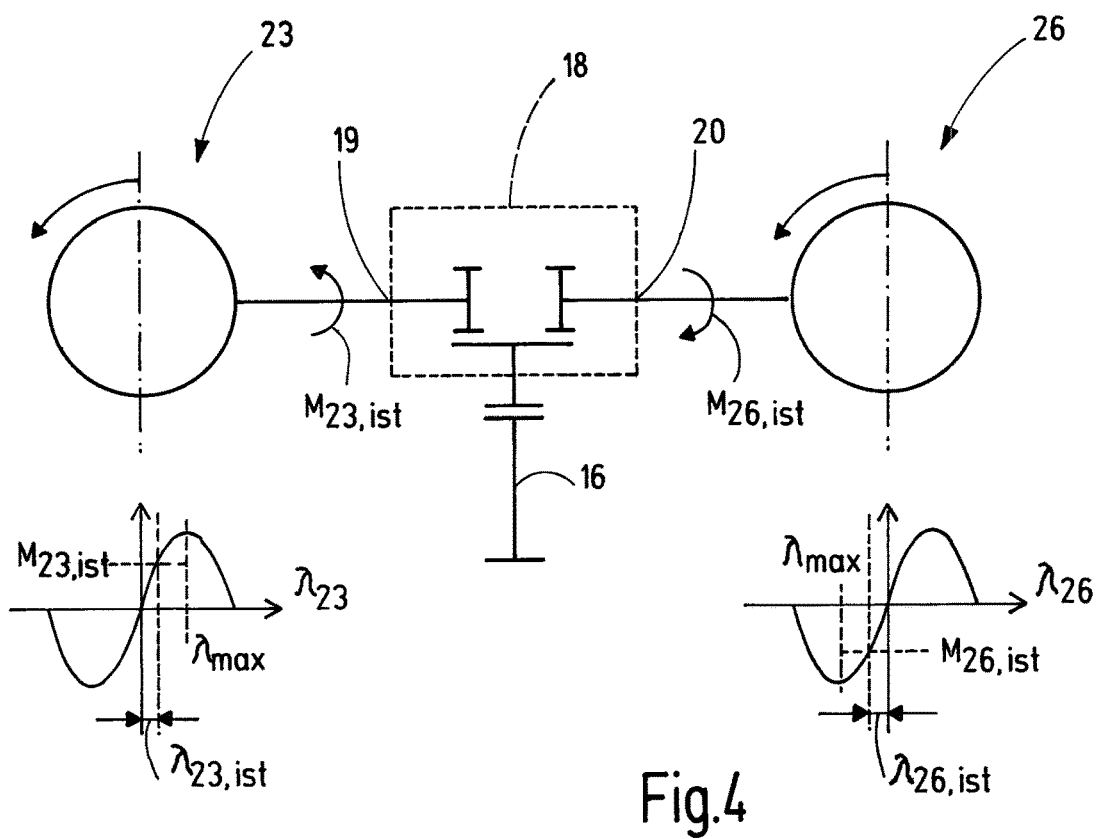

As the result of the use of two stepper drive units 21, 24, the positioning drive 15 has two degrees of freedom, by means of which the power take-off element 16 is positioned, for one thing, and for another, the tensioning state can be produced. In the tensioning state, the stepper motors 23, 26 of the stepper drive units 21, 24 each have a load angle $\lambda_i$, thereby producing a motor moment $M_i$. The motor moments $M_i$ are of equal size, in terms of amount, for example, and have a different direction (FIG. 4).

As a function of the kinematic reference value PS and the tensioning reference value VS, the central unit 31 determines a first control signal A1 for the first stepper drive unit 21 and a second control signal A2 for the second stepper drive unit 24. The control signals A1, A2 indicate a position change, in each instance, for the related stepper drive 23 and 26. In this regard, it is indicated by the related control signal A1, A2 for positioning of the power take-off element 16 in what direction the stator field 23S or 26S is supposed to be rotated, and by what amount or by what step number the rotation is supposed to take place. The related control signal A1, A2 can also predetermine a variable that characterizes the stator field intensity, such as, for example, the current amplitude $ID_{i,soll}$. Preferably, however, its amount is constant and is not changed during positioning of the power take-off element 16.

According to the invention, a tensioning situation can be produced by way of the kinematic coupling unit 18 as well as the control signals A1, A2 and the stator field variables indicated thereby. This is because the rotor fields cannot follow the stator fields in the tensioning state. As a result, a load angle $\lambda_i$ builds up at every stepper motor 23, 26. The control signals A1, A2 can increase the size of the load angles $\lambda_i$ of the stepper motors 23, 26, in that they provide opposite direction of rotation defaults for the stator fields in question, or move the power take-off element, in that they provide direction of rotation defaults in the same direction for the stator fields. The central unit 31 is set up for outputting suitable control signals A1, A2 in opposite directions or in the same direction, or also superimpositions of signals in opposite directions or in the same direction, so that not only the overriding position regulation but also the subordinate tensioning regulation or tensioning control is performed. The control signals therefore indicate which load angle $\lambda_i$ is supposed to be set at the stepper motors 23, 26, in order to achieve the desired tensioning state.

The stepper drive controllers 22, 25 have no inputs by way of which the motor moment or a motor current that defines the motor moment, particularly an armature transverse current, can be set. The stepper drive controllers 22, 25 merely have inputs at which the amount of a rotational movement of a stator field (in other words the stator field reference angle $\rho_{i,soll}$) and/or its direction of rotation and/or its field intensity are set. In this regard, the field intensity is proportional to the current reference amplitude $I_{Di,soll}$. The reference currents $I_{ki,soll}$ for the phases k=1 to n are calculated from the current reference amplitude $I_{Di,soll}$ and the stator field reference angle $\rho_{Si,soll}$.

The stepper motors 23, 26 preferably have a number of pole pairs of at least 25.

The respective stepper drive controller 22 or 25 is set up for setting the actual currents $I_{ki,ist}$ for the different phases k of the related stepper motor 23 or 26 on the basis of the reference currents $I_{ki,soll}$. Each reference current $I_{ki,soll}$ for a phase is calculated as follows, as a function of the number of phases:

$$I_{ki,soll} = ID_{i,soll} \cdot \sin\rho_{Si,soll} + (k-1) \cdot 90° \tag{1a}$$

for a stepper motor having n=2 phases, and $$I_{ki,soll} = ID_{i,soll} \cdot \sin\left(\rho_{Si,soll} + (k-1) \cdot \frac{360°}{n}\right) \tag{1b}$$

for a stepper motor having n>2 phases.
with:
$I_{ki,soll}$: reference current for the phase k;
$ID_{i,soll}$: current amplitude reference value;
$\rho_{Si,soll}$: stator field reference angle of the stator i;
i: is index for the stepper motors 23, 26;
k: index for the phases (k=1, 2, . . . n).
In this regard, the following holds true:

$$I_{Di,soll} = \sqrt{\Sigma_{k=1}^{n}(I_{ki,soll})^2} \tag{1c}$$

The current control loop, including the winding inductivities and the winding resistances, can be described using a delay element of the first order. The actual currents $I_{ki,ist}$ for the phases come out to:

$$I_{ki,ist}(t) = I_{ki,soll} \cdot (1 - e^{-\frac{t}{\tau}}) \tag{1d}$$

The time constant τ is small and therefore Equation (1d) can be simplified as:

$$I_{ki,ist} \approx I_{ki,soll} \text{ or } \rho_{si,ist} \approx \rho_{si,soll}.$$

Figure 3:
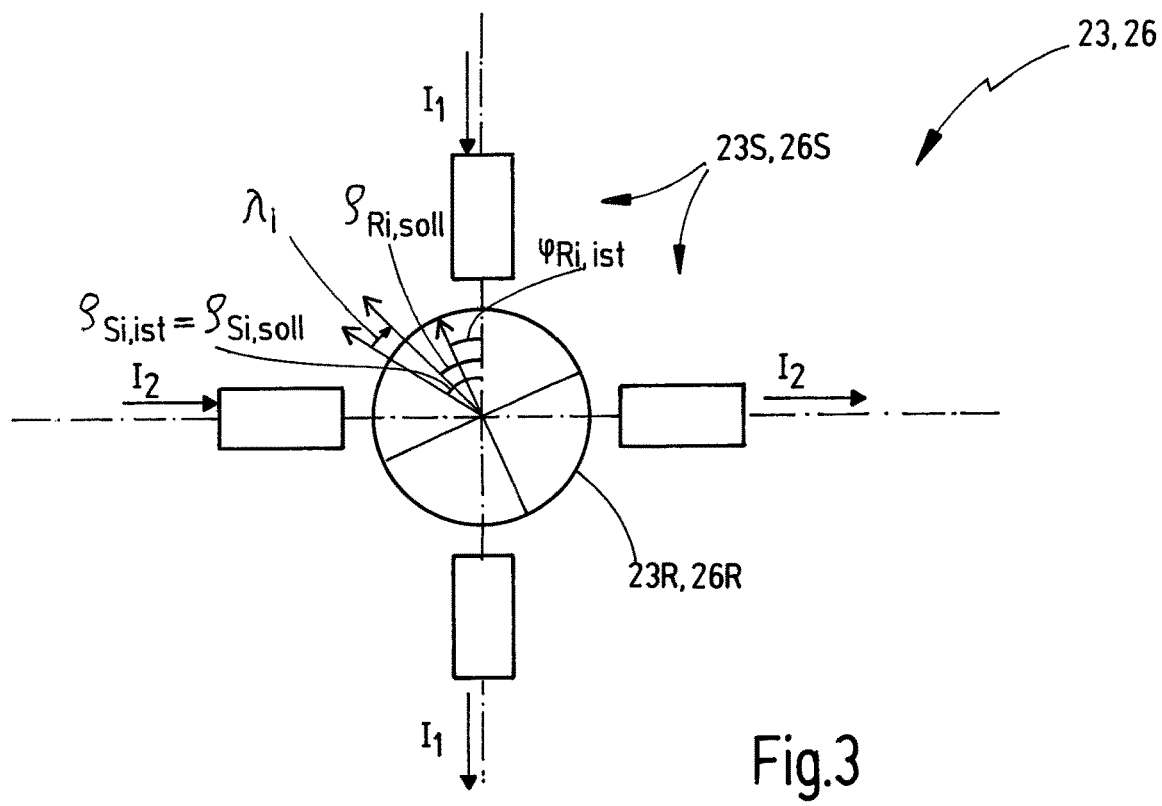

In FIG. 3, two currents $I_1$, $I_2$ for the individual phases of a stator 23S, 26S are illustrated schematically. The stator field actual angle $\rho_{si,ist}$ for the related stator 23S, 26S can be set by way of the string currents $I_k$.

Figure 2:
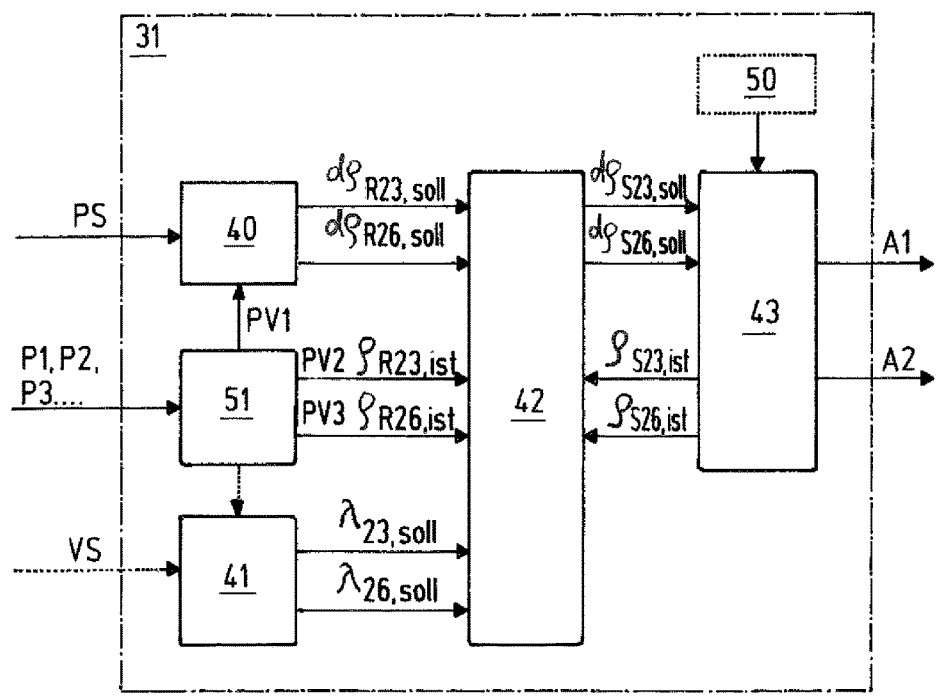

In FIG. 2, the central unit 31 with its functions is illustrated in greatly simplified and symbolic manner. The position signals P1, P2, P3 are transmitted to the central unit 31, according to the example, as has already been explained in connection with FIG. 1. The central unit 31 has an overriding position control loop 40. In the position control loop 40, the position of the power take-off element 16 is controlled in overriding manner. For this purpose, the first position signal P1, in particular, is transmitted to the position control loop 40.

The central unit 31 furthermore has a tensioning default block 41, which selects a tensioning strategy and transmits it to a subsequent method block 42 on the basis of the tensioning reference value VS and, if applicable, one or more position signals P1, P2, P3. For selection of the tensioning strategy, the control signals A1, A2 and/or the kinematic reference value PS or other available signals or values can also be transmitted to the tensioning default block 41, in addition or alternatively. For example, as a tensioning strategy at a high speed of rotation of the stepper motors 23, 26 or at a rapid movement of the power take-off element 16, the tensioning can be reduced or eliminated entirely, if the freedom from play of the coupling unit 18 is not important in the case of rapid adjustment. One or more of the following possibilities can be considered as a tensioning strategy, for example:
- the tensioning reference value VS is predetermined and is maintained unchanged and used to calculate a reference value for the tensioning moment $M_{V,soll}$ one time;
- as a function of the tensioning reference value VS and at least one further parameter, such as a position signal P1, P2, P3, a modified tensioning reference value VS' and thereby continuously a reference value for the tensioning moment $M_{V,soll}$ is calculated, on the basis of which a load angle reference value $\lambda_{i,soll}$ for each stepper motor 23, 26 is passed on to the method block 42;
- as a parameter for calculation of the modified tensioning reference value VS' or of the reference value for the tensioning moment $M_{V,soll}$, the speed of rotation and/or the acceleration of at least one stepper motor 23, 26 or of the power take-off element 16 can be used, for example.

Depending on the selected tensioning strategy in the tensioning default block 41, a motor reference moment $M_{i,soll}$ is determined for each stepper drive 23, 26 and thereby a load reference angle $\lambda_{i,soll}$ is determined. In the exemplary embodiment, the motor reference moment $M_{i,soll}$ is described by means of a load reference angle $\lambda_{i,soll}$. The relationship between the motor reference moment and the load reference angle can be set as a function of the motor type, for example by a characteristic field, a function or a table. The load reference angle $\lambda_{i,soll}$ defines the respective motor reference moment $M_{i,soll}$, which is generated by the related stepper motor 23 or 26. In this regard, the following relationship applies: The load actual angle $\lambda_{i,ist}$ corresponds to the difference between the rotor field actual angle $\rho_{Ri,ist}$ minus the stator field actual angle $\rho_{Si,ist}$.

$$\lambda_{i,ist} = \rho_{Si,ist} - \rho_{Ri,ist} \quad (2)$$

with:
$\lambda_{i,ist}$: load actual angle of the stepper motor i;
$\rho_{Ri,ist}$: rotor field actual angle of the stepper motor i;
$\rho_{Si,ist}$: stator field actual angle of the stepper motor i.

Depending on the number of pole pairs of the stepper motor 23, 26, the following relationship exists between the rotor field actual angle $\rho_{Ri,ist}$ (electrical rotor field angle) and the mechanical rotor actual angle $\varphi_{Ri,ist}$:

$$\rho_{Ri,ist} = \varphi_{Ri,ist} \cdot pz_i \quad (3)$$

with:
$\rho_{Ri,ist}$: rotor field actual angle of the stepper motor i;
$\varphi_{Ri,ist}$: mechanical rotor actual angle of the stepper motor i;
$pz_i$: number of pole pairs of the stepper motor i.

A corresponding relationship holds true for the stator field actual angle $\rho_{Si,ist}$ (electrical stator field actual angle) and the mechanical stator actual angle $\varphi_{si,ist}$:

$$\rho_{Si,ist} = \varphi_{Si,ist} \cdot pz_i \quad (4)$$

with:
$\rho_{Si,ist}$: stator field actual angle of the stepper motor i;
$\varphi_{Si,ist}$: stator actual angle of the stepper motor i;
$pz_i$: number of pole pairs of the stepper motor i.

A production-related or assembly-related angle offset $\varphi_{Si,0}$ for the stator and/or a production-related or assembly-related angle offset $\varphi_{Ri,0}$ for the stator is ignored in Equations (3) and (4).

$$\rho_{Ri,ist} = (\varphi_{Ri,ist} - \varphi_{Ri,0}) \cdot pz_i \quad (3')$$

$$\rho_{Si,ist} = (\varphi_{Si,ist} - \varphi_{Si,0}) \cdot pz_i \quad (4')$$

The angle offsets can be eliminated by means of control technology. They can be determined by means of an initialization process, for example a reference run, or by means of the use of absolute angle transducers.

The respective mechanical rotor actual angle $\varphi_{Ri,ist}$ can be measured, calculated or estimated. In the present case, the mechanical rotor actual angle for the first stepper motor 23 is described by the second position signal P2, and the rotor actual angle of the stepper motor 26 is described by the third position signal P3. In this way, the respective electrical rotor field actual angles can be determined according to Equation (3).

The stator field reference angle $\rho_{Si,soll}$ is known, since it was output by way of the related output signal A1 or A2, and therefore the stator actual angle $\varphi_{Si,ist}$ is also known, since it was determined in the respective preceding control cycle and therefore can be used for calculation of the stator field actual angle $\rho_{Si,ist}$ according to Equation (4). Therefore the load actual angle $\lambda_{i,ist}$ can be determined and compared with a load reference angle $\lambda_{i,soll}$, which is transmitted to the method block 42 by the tensioning default block 41. Accordingly, the method block 42 can determine a change rate on the basis of the deviation between the load reference angle $\lambda_{i,soll}$ and the load actual angle $\lambda_{i,ist}$, by way of a regulator, which rate is superimposed with the temporal change rate for the rotor field reference angle $\rho_{Ri,soll}$, thereby setting the corresponding tensioning moment $M_{i,ist}$ (FIG. 2b).

The central unit 31 furthermore has an output block 43. Finally, the control signals A1, A2 for the stepper drive units 21, 24 are determined in the output block 43.

Figure 2A:
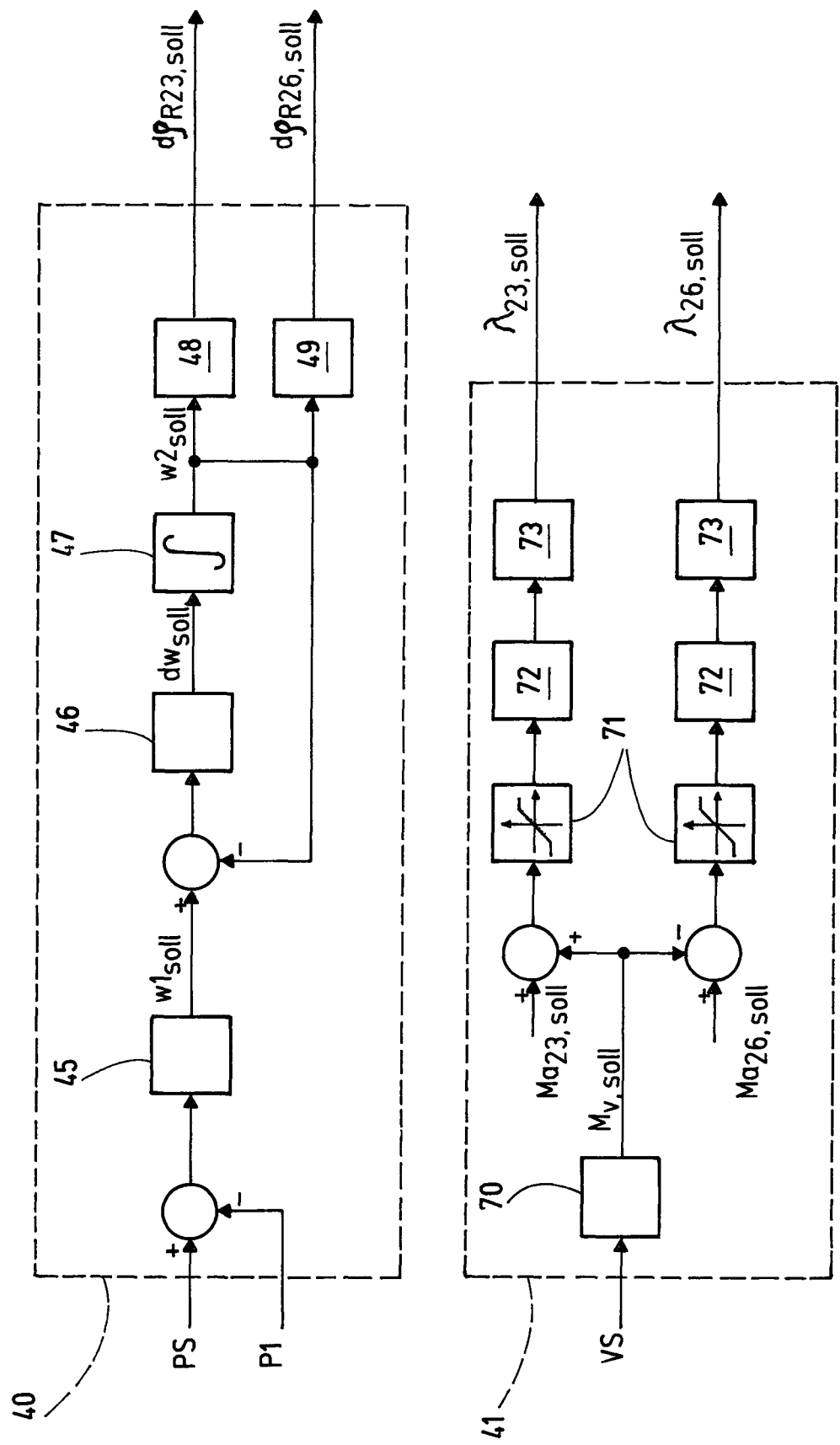
Figure 2B:
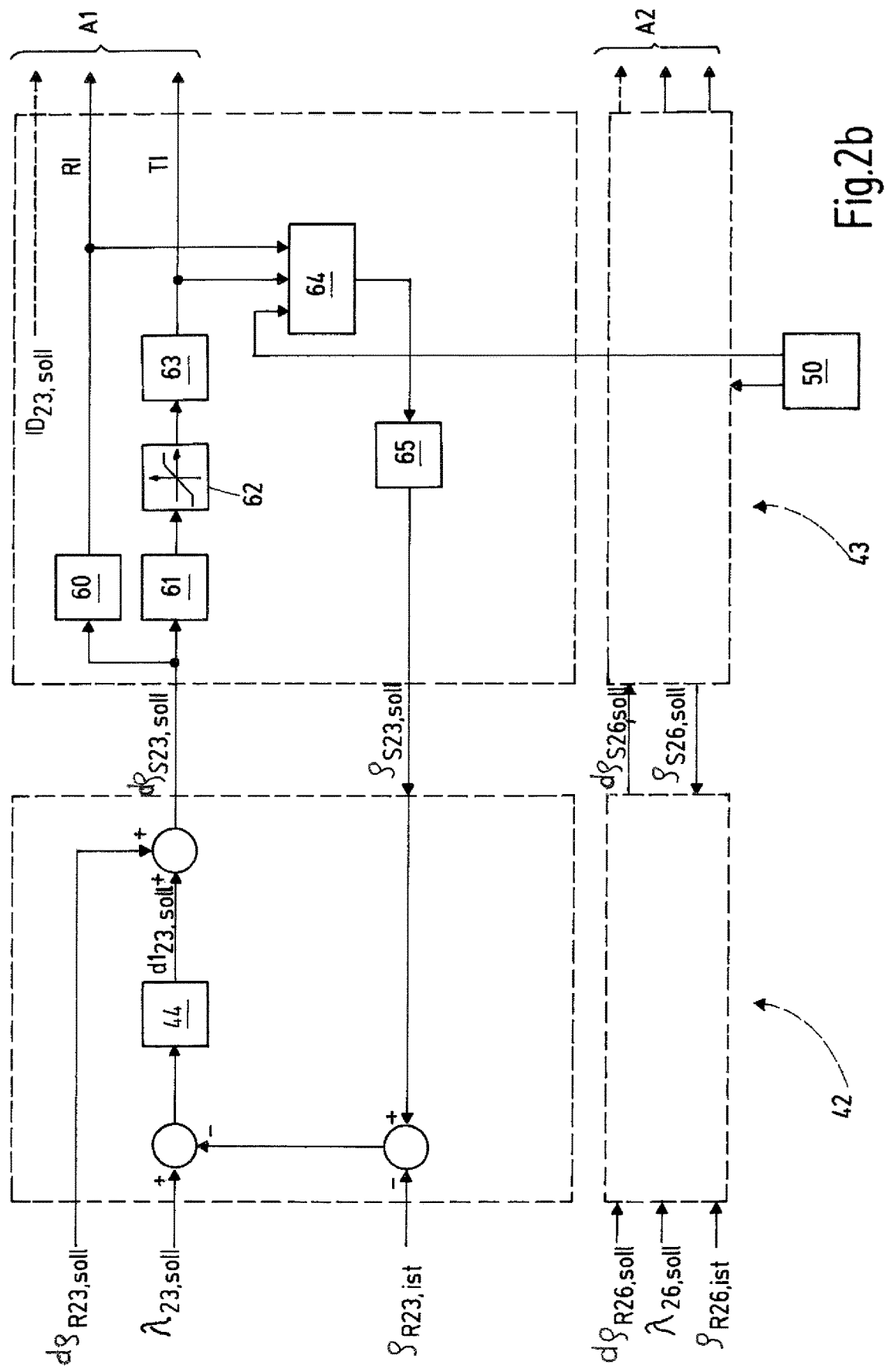

In FIG. 2b, part of the method block 42 as well as of the output block 43 is illustrated, which part serves to generate and output the first control signal A1. Corresponding to this, further parts of the method block 42 or of the output block 43 are present, which parts serve to determine and output the second control signal A2.

In the method block 42, a proportional regulator for load angle control, for example, is used as a regulator. In the method block 42, the stator field reference angle $\rho_{Si,soll}$ is supplied, which angle approximately corresponds to the stator field actual angle $\rho_{Si,ist}$. By means of forming the difference with the rotor field actual angle $\rho_{Ri,ist}$, the respective load actual angle $\lambda_{i,ist}$ is obtained. The control deviation between the load reference angle and the load actual angle is transmitted to the load angle regulator 44. The latter generates a first lateral reference change rate $d1_{i,soll}$ at its output, which rate is superimposed with the reference change rate for the rotor field reference angle $\rho_{Ri,soll}$ of the position control loop 40 (see FIG. 2). From this, a temporal reference change rate for the stator field reference angle $\rho_{Si,soll}$ is obtained, which is transmitted by the output block 43.

Regulation of the load angle is carried out in a subordinate control loop. For example, the overriding position control loop 40 can regulate the respective rotor actual angle and thereby the position of the power take-off element 16, while the subordinate regulator regulates for the load angle $\lambda_i$ or the stator field angle $\rho_{Si}$.

For implementation of the regulator, P regulators, PI regulators, PID regulators or the like can be used. By means of setting the regulators for the overriding or the subordinate control loop, a stable overall system can be achieved.

In general, attention must be paid, in the case of the regulators used, that the stepper drives are not overloaded. Therefore it is advantageous if the regulators have manipulated variable restrictions such as speed of rotation restrictions or acceleration restrictions. This is because stepper drives are generally not capable of withstanding overloads, in comparison with servomotors, because generally, the current amplitude is kept constant, and after the maximal load angle has been exceeded, the moment cannot be further increased.

In FIG. 2a, the position control loop 40 as well as the tensioning default block 41 of the central unit 31 are shown schematically, on the basis of an exemplary embodiment.

The position reference value PS as well as the first position signal P1 are passed to the position control loop 40, and their difference is formed and passed to a position regulator 45. The position regulator outputs a first reference speed of rotation $w1_{soll}$. Subsequently, a difference between the first reference speed of rotation $w1_{soll}$ and a second reference speed of rotation $w2_{soll}$ is formed and passed to a speed of rotation regulator 46, which outputs a reference speed of rotation change $dw_{soll}$ for the power take-off element 16. The reference speed of rotation change $dw_{soll}$ is integrated in an integrator 47, and the second reference speed of rotation $w2_{soll}$ is formed from this. This second reference speed of rotation $w2_{soll}$ is subsequently transmitted to a first kinematic model 48 as well as a second kinematic model 49. These form the gear step-ups that might be present in the coupling unit 18, as well as characterizing parameters of the stepper drives, such as the respective number of pole pairs. At the outputs, the change rate $d\rho_{Ri,soll}$ of the rotor field reference angle $\rho_{Ri,soll}$ for the respective stepper motor 23 or 26 is determined, output, and transmitted to the method block 42, in each instance.

As illustrated in FIG. 2a, here the second reference speed of rotation $w2_{soll}$ output by the integrator is used as the actual speed of rotation. This signal is free of measurement noise and allows great loop amplification in the speed of rotation regulator 46. A manipulated variable restrictor follows the regulators 45, 46, in each instance, in order to adhere to the required acceleration or speed of rotation limit. Overload of the stepper drives and getting out of step are avoided. The manipulated variable restrictors can perform a respective manipulated variable restriction to constant values or variably, in parameter-dependent and situation-dependent manner, so to speak.

In the output block 43 (FIG. 2b) of the central unit 31, a clock pulse TI as well as a direction pulse RI are generated from the change rates $d\rho_{Si,soll}$ of the stator field reference angles $\rho_{Si,soll}$ that were determined in the method block 42. For this purpose, the reference change rate $d\rho_{Si,soll}$ of the respective stator field reference angle $\rho_{Si,soll}$ is evaluated, in each instance. The direction pulse RI results from a prefix determination unit 60. The amount of the reference change rate of the stator field reference angle is determined by an amount formation unit 61, if necessary multiplied by a proportional factor, subsequently passed to a clock generator 63 that outputs the clock pulses TI, by way of a restriction unit 62. The direction pulse RI, the clock pulse TI, as well as the current amplitude reference value $ID_{i,soll}$, if applicable, accordingly result in the related control signal A1 or A2.

The related control signal A1 or A2 is passed to a counter 64, which determines the absolute step number of the related stepper motor 23, 26 from this. From this, in a calculation unit 65, the related stator field reference angle $\rho_{Si,soll}$ can be determined and transmitted to the method block 42, in each instance.

The load reference angles $\lambda_{i,soll}$ for the stepper motors 23, 26 are determined in the tensioning default block 41 (FIG. 2a). In a function block 70, the tensioning reference moment $M_{V,soll}$ is determined from the tensioning reference value VS, and subsequently processed further, separately for the two stepper motors 23, 26, in a calculation segment, in each instance, which segments fundamentally have the same structure. Each calculation segment has a restriction block 71, a first standardization block 72, and a second standardization block 73. In the restriction block, the respective motor moment is restricted to a maximal moment. In this way, the result can be achieved that a maximal load angle is not exceeded. Subsequently, the output signal of the restriction block 71 is standardized to the maximal moment in the first standardization block 72, and finally standardized to the maximal load angle in the second standardization block 73, and output as a load reference angle $\lambda_{i,soll}$. The maximal moment can be determined as a function of the current amplitude reference value $ID_{i,soll}$, of torque constants, of the current angular velocity or speed of rotation, and of the operating voltage.

Optionally, an additional moment $Ma_{i,soll}$ corresponding to a desired acceleration value can be added to the tensioning reference moment $M_{V,soll}$ for each calculation segment ahead of the respective restriction block 71, in order to apply a targeted acceleration moment to the respective stepper drive 23 or 26.

The tensioning state in the coupling unit 18 during positioning when the position of the power take-off element 16 has been reached is illustrated schematically in FIG. 4. By means of a first load actual angle $\lambda_{23,ist}$ at the first stepper motor 23 and a second load actual angle $\lambda_{26,ist}$ at the second stepper motor 26, tensioning moments $M_{23}$ and $M_{26}$ are generated, which are directed in opposite directions. By means of these two tensioning moments $M_{23}$, $M_{26}$, the power take-off element 16 is not moved, but rather held in position or moved to it, with elimination of the play in the coupling unit 18, which position in turn is predetermined by the overriding position regulator.

The load reference angle $\lambda_{i,soll}$ is restricted to a maximal load angle $\lambda_{max}$ as a function of the type of the stepper motor. In this way, it is ensured that the load reference angle $\lambda_{i,soll}$ is in a range in which the amount of the load moment or motor moment $M_i$ increases with an increasing amount of the load angle actual value $\lambda_{i,ist}$ (FIG. 4). In the case of permanent-magnet stepper motors, the load angle is restricted to 90°, in terms of amount, and in the case of reluctance stepper motors, to 45°, while in the case of hybrid stepper motors, the maximal load angle can lie in the range from 45° to 90°. In the case of greater load angles, in terms of amount, the motor moment of the stepper motors 23, 26 would decrease again.

If the positioning drive 15 does not have any position sensors 29, 30 for determining the position of the respective rotor 23R, 26R, a control method can also be used in place of a regulator for the motor moments $M_i$. For this purpose, the central unit 31 can have an initialization block 50. By way of the initialization block 50, first a defined starting situation is produced. For this purpose, the power take-off element 16 can be moved to a defined zero position, for example; in the case of rotationally driven power take-off elements, this happens preferably once in each direction of rotation. This is particularly carried out individually and separately for both stepper drive units 21, 24. The zero position is detected by a sensor, for example by means of the first position sensor 28. By means of the initialization, a relationship between the rotational movement of each rotor 23S, 26S and the power take-off element 16 is detected and stored in memory. In this regard, gear step-up errors in the mechanical coupling unit 18 can also be corrected. A load reference angle $\lambda_{i,soll}$ can now be set, proceeding from an original rotational position of the rotors 23R, 26R, by means of a predetermined number of rotational steps. Otherwise, the control method corresponds to the regulation described above.

If the second position signal P2 and the third position signal P3 are not available, these two position signals can also be estimated or determined, in the play-free state, using the first position signal P1 as well as depending on the respective gear step-up in the coupling unit 18. The second position signal P2 results from multiplication of the gear step-up $i_{17,23}$ between the coupling output 17 and the first stepper motor 23, multiplied by the first position signal P1. The third position signal P3 results, analogous to this, from multiplication of the gear step-up $i_{17,26}$ between the coupling output 17 and the second stepper motor 26, multiplied by the first position signal P1. The virtual sensor signals PV2 and PV3 then result from multiplication by the related number of pole pairs.

If the first position signal P1 is also not available, it can also be estimated or determined. With the proviso that the current amplitudes are approximately the same in size and that similar stepper motors are used, the power take-off element 16 will assume an approximately central position, so that the following holds true:

$$PV1 = 0{,}5(PZ_{23} \cdot \rho_{S23,ist} \cdot i_{17,23} + PZ_{26} \cdot \rho_{S26,ist} \cdot i_{17,26}) \quad (5)$$

with:
- $PZ_{23}$: number of pole pairs of the first stepper motor 23;
- $PZ_{26}$: number of pole pairs of the second stepper motor 26;
- $i_{17,23}$: gear step-up between coupling output 17 and first stepper motor 23;
- $i_{17,26}$: gear step-up between coupling output 17 and second stepper motor 26.

In this way, ultimately pure control without position signal feedback can be achieved. However, it can also be advantageous to use the first position signal P1 and to merely determine the virtual position signals PV2, PV3. For this purpose, the first position signal P1 or the virtual first position signal PV1 can be used:

$$PV2 = \rho_{R23,ist} = PV1 \cdot PZ_{23} \cdot i_{17,23} \quad (6a)$$

$$PV3 = \rho_{R26,ist} = PV1 \cdot PZ_{26} \cdot i_{17,26} \quad (6b)$$

The possibility of being able to calculate the first position signal P1 in several different ways, alternatively or redundantly, can also be used to recognize a sensor defect and/or to recognize blocking of the drive. Specifically when using stepper motors, this can be relevant, because the stepper motors 23, 26 are not tolerant to overload. Accordingly, suitable measures can be initiated. For example, in the case of a sensor defect in the position determination of the power take-off element 16, it is possible to switch over to emergency control, in which the virtual first position signal PV1 is used instead of the first position signal. In the event of an overload of at least one stepper drive 23, 26, an emergency stop and/or an error signal can be output.

If the sensor signal block 51 is not present, the position signals P1, P2, P3 are used in place of the virtual sensor signals PV1, PV2, PV3 for regulation within the central unit 31.

Using the positioning drive 15, a sub-step position change can furthermore be achieved in the tensioning state. This is particularly relevant if a constant tensioning moment $M_V$ is set and the load reference angles are supposed to remain constant, particularly in the reference position or target position of the power take-off element 16. In this regard, the load angle regulator can be shut off.

Figure 8:
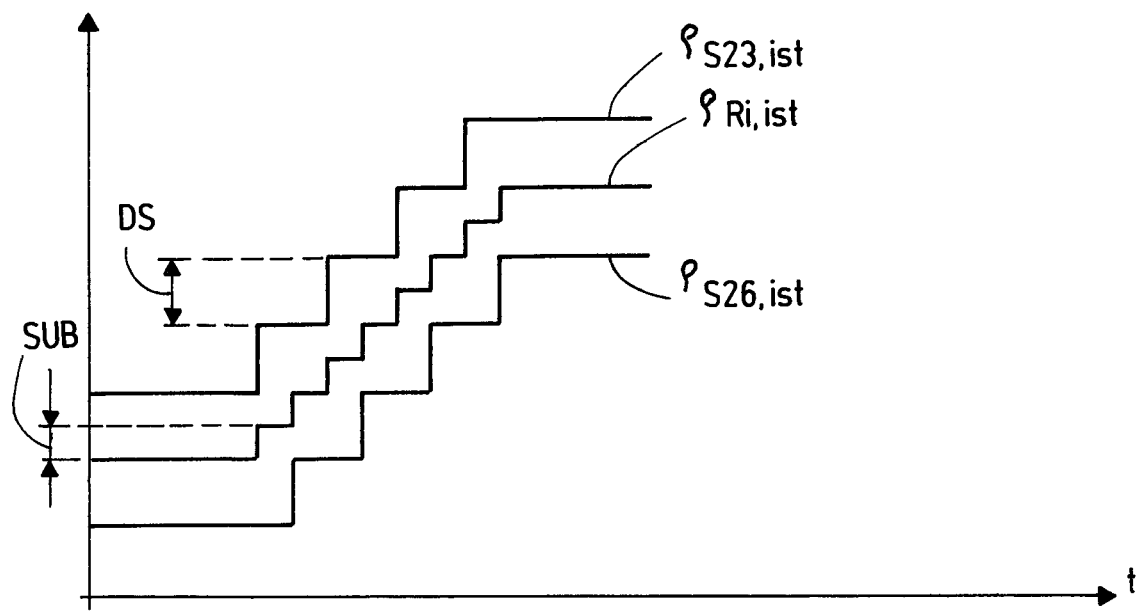

A sub-step position change is illustrated schematically in FIG. 8. Outside of the tensioning state, every stepper motor 23, 26 can perform the smallest possible rotational step DS. In the tensioning state, a sub-step position change SUB can additionally be brought about, in that the stator fields of the two stepper motors 23, 26 are alternately rotated in the same direction, by a rotational step DS, with temporal offset. As long as only one of the two stator fields is moved by a rotational step DS, the rotor angle of the two stepper motors cannot follow completely. On the basis of the kinematic coupling, the load angle increases at both stepper motors, thereby causing each rotor position and thereby also the power take-off element position to move by only one sub-step position change SUB. This can correspond to a half-step, for example, if the kinematic gear step-ups between the two stepper drives 23, 26 and the coupling output 17 are of equal size and the stepper drives are structured identically and furthermore have the same current amplitude.

During adjustment of the stator field actual angle of only one stepper drive unit, the other stepper drive unit will prevent rotation of the power take-off element 16 by the full step amount, and instead will increase both its own load angle and also that of the other stepper drive unit. Only when the other stepper drive unit is also moved one micro-step further (in that the stator field actual angle is correspondingly rotated further) is the power take-off element 16 also rotated further by the full amount, and the load angle of both stepper drive units is reduced once again. In this way, sub-micro-step resolutions can be achieved by means of an alternating step sequence, which resolutions are illustrated here as sub-step position change SUB.

If the two stator angles are now moved sequentially in the same direction of rotation, by one rotational step DS, in each instance, in this way the rotor angle of the two stepper motors and thereby the power take-off element 16 can be moved by the sub-step position change, in each instance, which corresponds to half the rotational step DS, according to the example. This is the case when the gear step-up ratios of the first coupling input 19 to the coupling output 17 and from the second coupling output 20 to the coupling output 17 are equal in size. Different gear step-ups would bring about sub-step position changes that are different in size, depending on whether the stator field of the stepper motor 23 or of the stepper motor 26 is moved by a rotational step DS.

Figure 9:
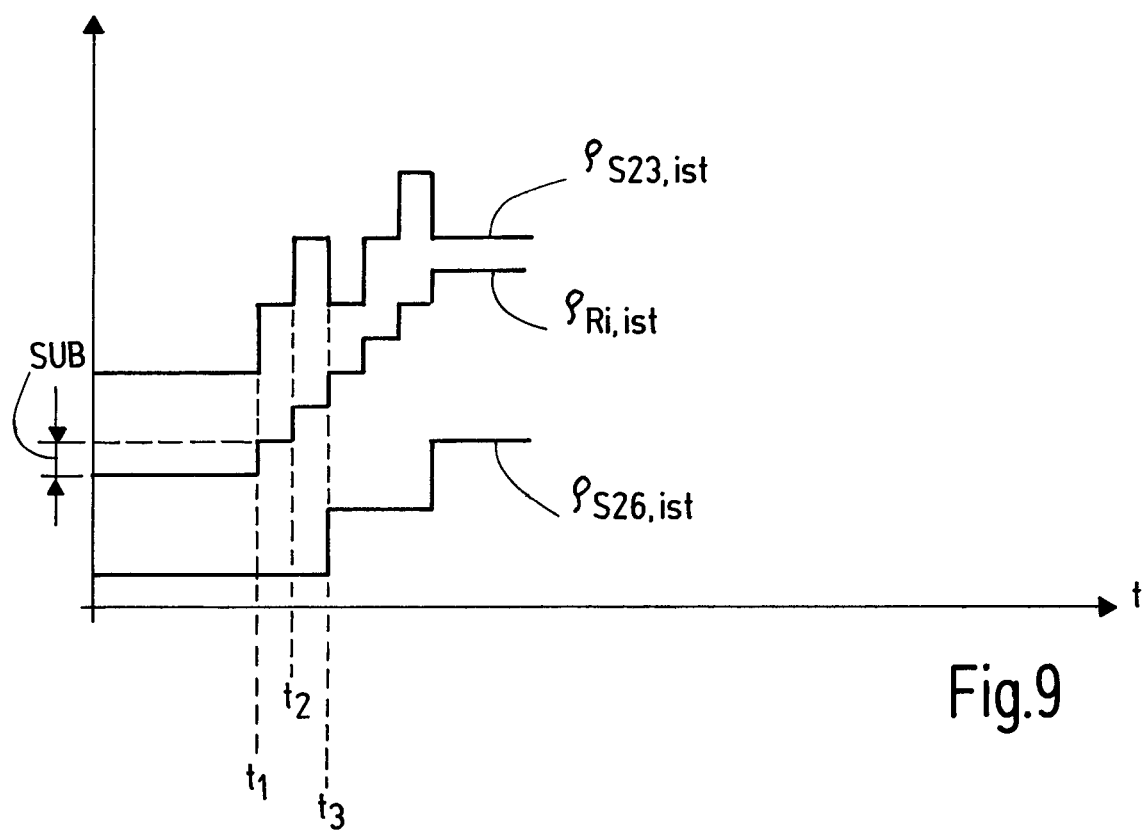

A further possibility for generation of a sub-step position change is illustrated schematically in FIG. 9. While in all the previous exemplary embodiments, the current amplitude value ID for generation of the stator fields was not changed, in the method illustrated in FIG. 9, according to the example, the current amplitude value $ID_i$ for generation of the stator field for the first stepper motor 23 is set to be smaller.

If the current amplitude of the stepper drive units 21, 24 is different, then a stator field step of the weaker stepper drive unit brings about a smaller load angle increase at the other stepper drive unit, in each instance, than at itself. In this way, the power take-off element 16 is moved not by half a micro-step, but rather correspondingly less. In such an embodiment, the stepper drive units 21, 24 have different effects on the coupling output 17 of the coupling unit 18, and this can be further reinforced by means of non-linearities in the moment load angle curve of the stepper drive units 21, 24. In this way, step sequences having differently large amounts can also be formed at the coupling output 17.

At first, as in the method for sub-step position change described in connection with FIG. 8, the stator field of the first stepper motor 23 is moved by one rotational step DS (first time point t1). To carry out the subsequent sub-step position change, the current amplitude value ID for generation of the first stator field is increased in size (second time point t2). The next sub-step position change SUB at a third time point t3 is achieved in that the current amplitude value ID of the first stator field is reduced back to its starting value, and, at the same time, the second stator field is moved by one rotational step DS. This method sequence can be carried out sequentially to perform sub-step position changes.

Furthermore, it is possible to further increase the sub-micro-step resolution in that the low-pass behavior on the basis of the mass inertias or of the delayed dynamics of the current control loops of the stepper drive controllers 22, 25 is utilized in targeted manner. In this regard, the central unit 31 generates pulse-width-modulated stepper signals that bring about the result that the respective stepper motor 23, 26 moves by a proportion of the micro-step that corresponds to the duty cycle. In this regard, the frequency of the pulse-width modulation must be sufficiently great so that on the basis of the low-pass behavior, no oscillations are generated at the power take-off element 16.

Figure 7:
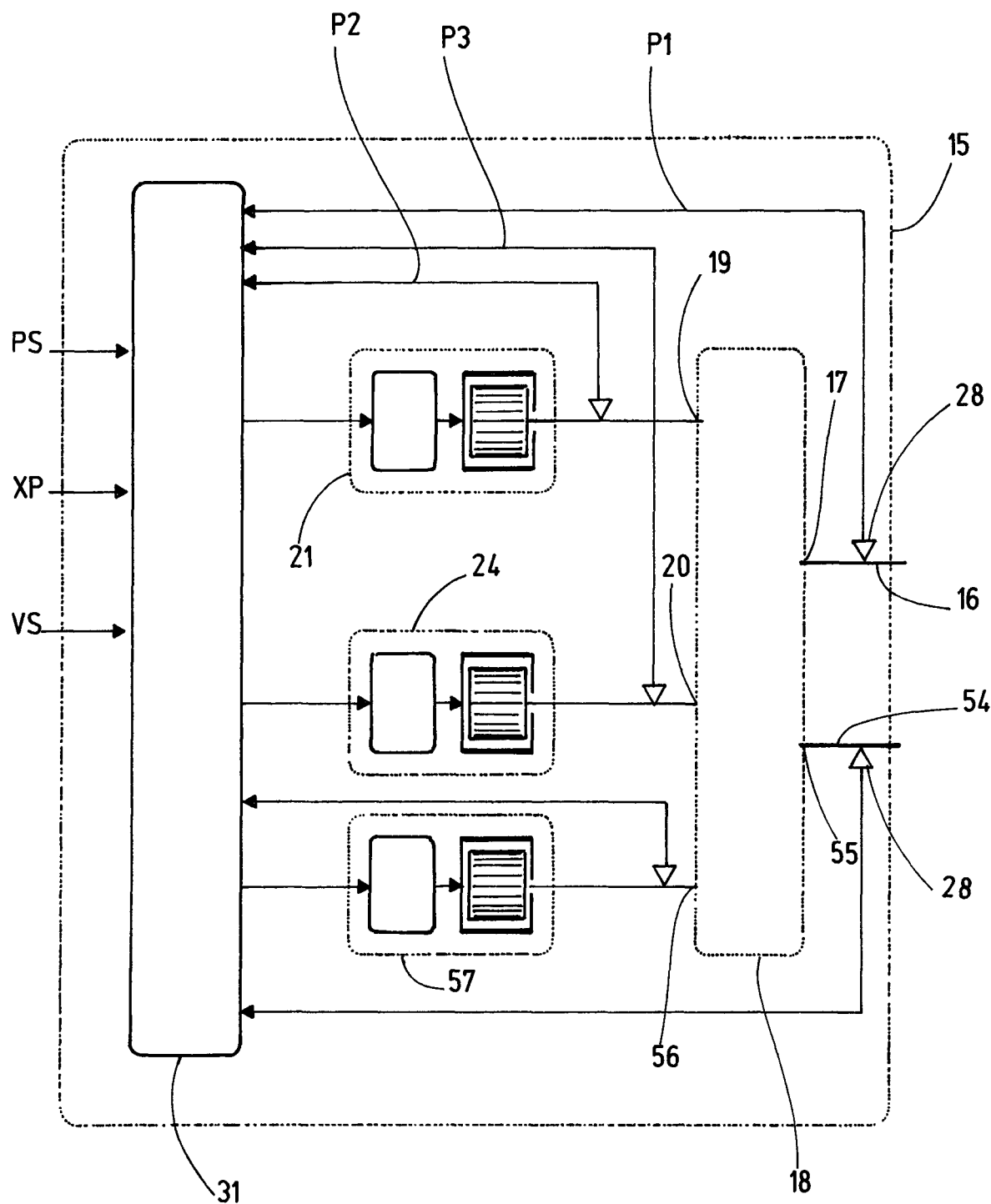

In FIG. 7, a further exemplary embodiment of the positioning drive 15 is illustrated. In contrast to the embodiment described above, the positioning drive 15 according to FIG. 7 has an additional power take-off element 54. The position of this additional power take-off element 43 is also detected by way of a first position sensor 28, analogous to the power take-off element 16. The coupling unit 18 has an additional coupling output 55, with which the additional power take-off element 54 is connected. The coupling unit 18 has, in addition to the first coupling input 19 and to the second coupling input 20, a third coupling input 56, to which a third stepper drive unit 57 is connected. As can be seen in FIG. 7, all the coupling inputs 19, 20, 56 are force-coupled with one another. The tensioning of the coupling unit 18 with regard to the first power take-off element 16 is brought about using the first stepper drive unit 21 and the second stepper drive unit 24, while the tensioning of the additional power take-off element 54 is brought about by the second stepper drive unit 24 and the third stepper drive unit 57. Because of the additional stepper motor unit, a third degree of freedom exists for control. The distribution of the tensioning moments to achieve force or moment equilibrium in the tensioning state, in total, can be predetermined, in this embodiment, by way of an additional parameter XP, for example. Alternatively, a further position default can also be issued by way of the additional parameter XP, so that independent position defaults can be made for the two power take-off elements. For the remainder, the exemplary embodiment corresponds, in terms of its structure and its method of functioning, to the exemplary embodiments and modification possibilities of the method and of the positioning drives 15 described above, as explained in connection with FIG. 1-4 as well as 8 and 9.

Because all the inputs and outputs of the coupling unit 18 are force-coupled or moment-coupled with one another, the additional setting property of the one excess drive unit that is present (there is one drive unit more than there are coupling outputs) can be used to build up the tensioning in the kinematic chain. However, control in terms of control technology is more complicated. For example, tensioning of five power take-off elements with six drive units would also be conceivable. Preferably, however, each power take-off element 17, 55 possesses two separate drive unit 21, 24 assigned to it, analogous to the representation in FIG. 1. This arrangement can also be provided multiple times, if multiple power take-off elements 17, 55 are present.

Figure 5:
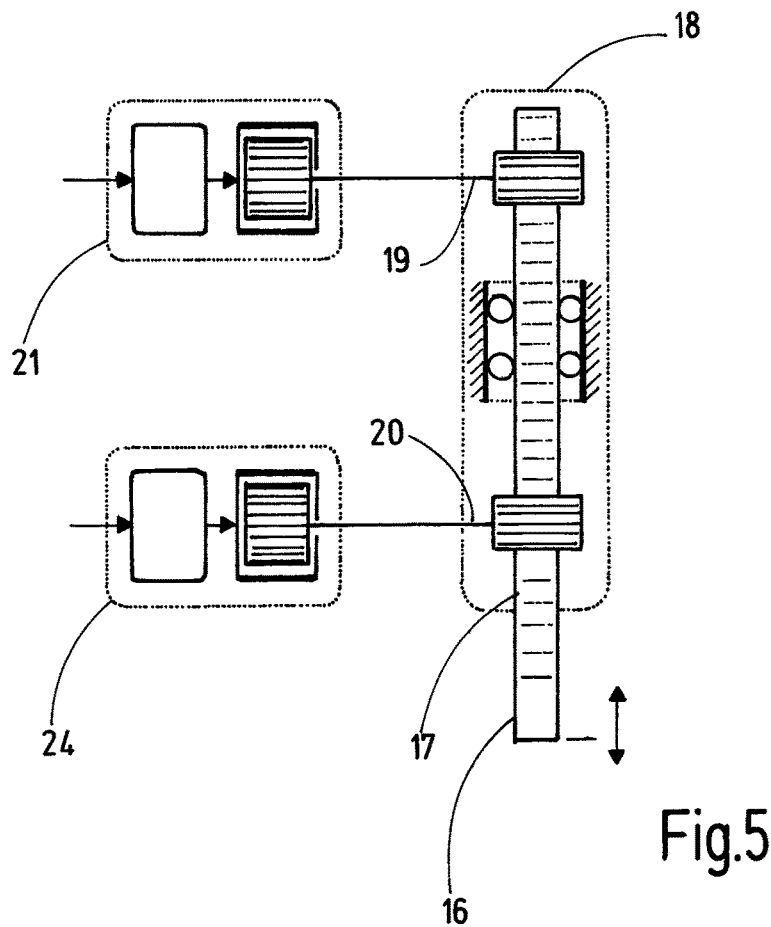
Figure 6:
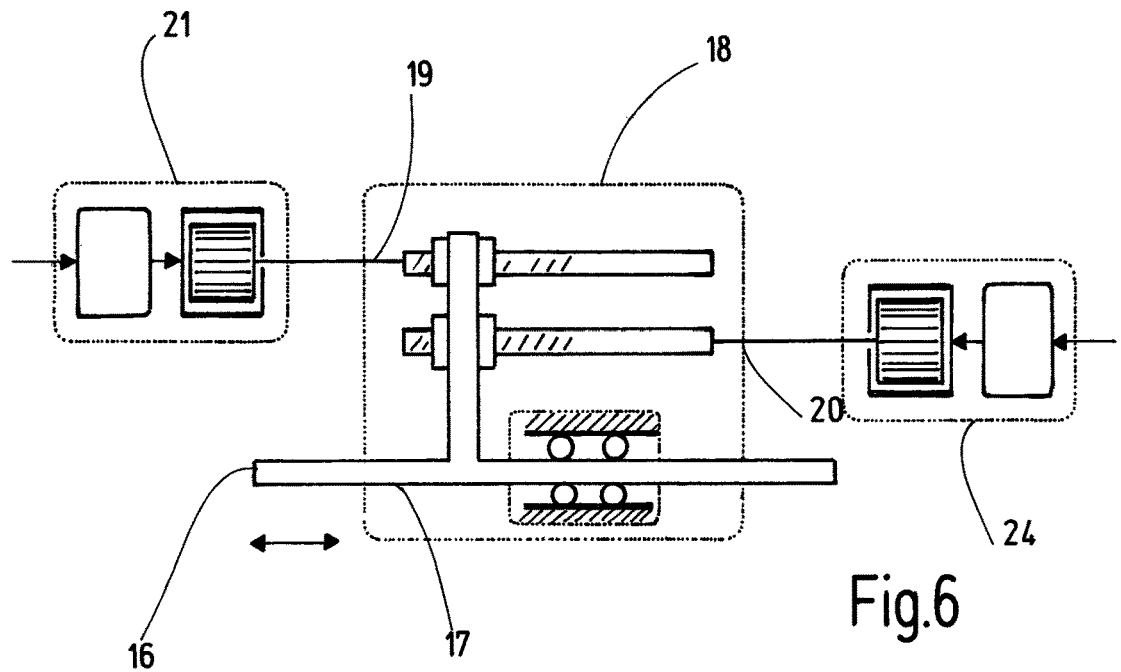

In FIGS. 5 and 6, variants of the coupling unit 18 and the type of power take-off element 16 are illustrated. In the exemplary embodiments in FIGS. 1 and 7, the coupling inputs were coupled with the coupling output of the coupling unit 18 by way of a gear wheel mechanism, and, in particular, a spur gear mechanism. In the exemplary embodiment according to FIG. 5, the power take-off element 16 is formed by a gear rack, which is mounted so as to be movable translationally and meshes with two gear wheels that each form a coupling input 19 and 20, respectively.

In FIG. 6, a further modified embodiment of the coupling unit 18 is illustrated, where both the first coupling input 19 and the second coupling input 20 are each formed by a rotating spindle, where a spindle nut sits on each rotary spindle. The spindles are disposed parallel to one another, in a direction in which the power take-off element 16 can be moved translationally. The power take-off element 16 is connected with the two spindle nuts using a coupling element, so that it can be moved translationally together with the spindle nuts.

The method of mechanical coupling between the coupling inputs 19, 20 and the coupling output 17 can be varied in many different ways. Preferably, the coupling unit 18 between the two coupling inputs 19, 20 and the coupling output 17 has no self-locking effect in both directions.

In FIG. 2a, the application of additional moments $Ma_{i,soll}$ is illustrated schematically. These additional moments can be calculated as a function of the second reference speed of rotation $w2_{soll}$ or the reference speed of rotation change $dw_{soll}$. The calculation can take place, for example, as a function of friction moment components and acceleration moment components. In this regard, one or more of the following variables are taken into consideration:

the friction factor for viscose friction with reference to the stepper motor 23, 26 in question;

the mass inertia moment of the gear mechanism step in question, between the respective stepper motor 23, 26 and the coupling output 17;

the respective mass inertia moment of the rotor of the stepper drive 23, 26 in question;

the adhesion friction moment of the stepper drive 23, 26 in question;

the measurement [Translator's Note: "Mess-" should probably be "Massen-"=mass] moment and inertia moment of the load, with reference to the respective stepper motor 23, 26;

the mass inertia moment of the power take-off element 16 with reference to the respective stepper drive 23, 26.

In this regard, the following equation can be used.

$$Ma_{i,soll} = M_{Ri} + M_{Bi} \quad (7)$$

with:

$$M_{Ri} = w2_{soll} \cdot (i_{17,i} \cdot K_i \cdot w_{Ri,ist} \cdot \text{sgn}(w_{Ri,ist}) \cdot M_{H,i}) \quad (8)$$

$$M_{Bi} = dw_{soll,i} i_{17,i} \cdot (J_{R,i} + J_{G17,7} + 0.5 \cdot (J_{R16,i} + J_{RL,i})) \quad (9)$$

with:

$M_{Ri}$ friction moment component;

$w2_{soll}$: second reference speed of rotation;

$i_{17,i}$: gear step-up between the coupling output 17 and the stepper motor 23 or 26;

$K_i$: friction factor for the stepper motor 23 or 26;

$w_{Ri,ist}$: actual speed of rotation of the rotor of the stepper motor 23 or 26;

$M_{H,i}$ adhesion friction moment of the stepper motor 23 or 26;

$dw_{soll,i}$: reference speed of rotation change for the stepper motor 23 or 26;

$J_{R,i}$: inertia moment of the rotor of the stepper motor 23 or 26;

$J_{G17,i}$: inertia moment of the coupling unit 18 from the coupling output 17 to the stepper motor 23 or 26;

$J_{R16,i}$: inertia moment component of the power take-off element with reference to the related stepper motor 23 or 26;

$J_{L,i}$: inertia moment of the load with reference to the related stepper motor 23 or 26.

The factor 0.5 [in German: 0,5] in Equation (9) indicates that each stepper motor 23, 26 only has to absorb half the acceleration of the drive-related mass inertia moments.

The invention relates to a positioning drive 15 as well as to a method for positioning of a power take-off element 16. The positioning drive 15 has a first stepper drive unit 21 having a first stepper drive controller 22 and a first stepper motor 23, as well as a second stepper drive unit 24 having a second stepper drive controller 25 and a second stepper drive 26. The two stepper drives 23, 26 and the power take-off element 16 are force-coupled and drive-coupled by way of a mechanical coupling unit 18, with the coupling unit 18 having play. A central unit 31 controls the two stepper drive controllers 22, 25 by way of a control signal A1 and A2, respectively. The control signals A1, A2 predetermine the stator field reference angle, in each instance, in such a manner that positioning of the power take-off element takes place, and a load angle occurs in the two stepper motors 23, 26, which angles bring about a tensioning moment that is set by way of the assigned stepper drive controller 22 or 25. The central unit 31 has an overriding regulator for the position of the power take-off element 16. It furthermore has a subordinate controller or regulator for setting motor moments $M_{23}$, $M_{26}$ in the opposite direction for each stepper motor 23, 26.

REFERENCE SYMBOL LIST 15 positioning drive
16 power take-off element
17 coupling output
18 coupling unit
19 first coupling input
20 second coupling input
21 first stepper drive unit
22 first stepper drive controller
23 first stepper drive
23R rotor of the first stepper drive
23S stator of the first stepper drive
24 second stepper drive unit
25 second stepper drive controller
26 second stepper drive
26R rotor of the second stepper drive
26S stator of the second stepper drive
27 sensor unit
28 first position sensor
29 second position sensor
30 third position sensor
31 central unit
40 position control loop
41 tensioning default block
42 method block
43 output block
44 load angle regulator
45 position regulator
46 speed of rotation regulator
47 integrator
48 first kinematic model
49 second kinematic model
50 initialization block
51 sensor signal block
54 additional power take-off element
55 additional coupling output
56 third coupling input
57 third stepper drive unit
60 prefix determination unit
61 amount formation unit
62 restriction unit
63 clock generator
64 counter
65 calculation unit
70 function block
71 restriction block
72 first standardization block
73 second standardization block
$\varphi_{Ri,ist}$ rotor actual angle
$\varphi_{Ri,soll}$ rotor reference angle
$\lambda_{i,ist}$ load actual angle
$\lambda_{i,soll}$ load reference angle
$\rho_{Ri,ist}$ rotor field actual angle
$\rho_{Ri,soll}$ rotor field reference angle
$\rho_{Si,ist}$ stator field actual angle
$\rho_{Si,soll}$ stator field reference angle
$d\rho_{Ri,soll}$ change rate of the rotor field reference angle
$d\rho_{Si,soll}$ change rate of the stator field reference angle
$d1_{i,soll}$ first temporal reference change rate
$dw_{soll}$ reference speed of rotation change
DS rotational step
$M_{23}$ first tensioning moment of the first stepper motor $M_{26}$ second tensioning moment of the second stepper motor
$Ma_{i,soll}$ additional moment
PS position reference value
P1 first position signal
P2 second position signal
P3 third position signal
ST1 first stepper signal
ST2 second stepper signal
SUB sub-step position change
RI direction pulse
TI clock pulse
$w1_{soll}$ first reference speed of rotation
$w2_{soll}$ second reference speed of rotation
VS tensioning reference value
XP additional parameter

The invention claimed is:

1. Positioning drive (15) for positioning of a power take-off element (16), the drive comprising:
   a mechanical coupling unit (18) that has a first coupling input (19), a second coupling input (20), and a coupling output (17), wherein the coupling output (17) is connected with the power take-off element (16),
   a first positioning drive unit (21), which has a first positioning drive (23) connected with the first coupling input (19), and a first positioning drive controller (22) that is set up to control the first positioning drive (23),
   a second positioning drive unit (24), which has a second positioning drive (26) connected with the second coupling input (20), and a second positioning drive controller (25), which is set up to control the second positioning drive (26),
   a central unit (31), to which a kinematic reference value (PS) and a tensioning reference value (VS) can be provided, or in which a kinematic reference value (PS) and/or a tensioning reference value (VS) can be determined,
   wherein the central unit (31) is set up to determine a first control signal (A1) for the first positioning drive controller (22) and a second control signal (A2) for the second positioning drive controller (25), as a function of the kinematic reference value (PS) and the tensioning reference value (VS),
   wherein the first control signal (A1) and the second control signal (A2) are predetermined in such a manner to generate tensioning moments ($M_{23}$, $M_{26}$) in opposite directions in the two positioning drives (23, 26), when applied in each instance,
   wherein the central unit (31) is set up to transmit the first control signal (A1) to the first positioning drive controller (22) and the second control signal (A2) to the second positioning drive controller (25),
   and wherein the first positioning drive controller (22) is set up to control the first positioning drive (23) as a function of the first control signal (A1) and the second positioning drive controller (25) is set up to control the second positioning drive (26) as a function of the second control signal (A2), so that a tensioning state is generated in the coupling unit (18);
   wherein both of the first positioning drive (23) and the second positioning drive (26), in the tensioning state, have a first load angle ($\lambda_{i,ist}$) that results from a difference between a rotor field reference angle ($\rho_{R23,soll}$, $\rho_{R26,soll}$) and a rotor field actual angle ($\rho_{R23,ist}$, $\rho_{R26,ist}$);
   wherein the rotor field reference angle ($\rho_{R23,soll}$, $\rho_{R26,soll}$) corresponds to a stator field actual angle ($\rho_{S23,ist}$, $\rho_{S26,ist}$).

2. Positioning drive according to claim 1, wherein the first control signal (A1) describes one or both of a first stator field reference angle ($\rho_{S23,soll}$) and a first rotor field reference angle ($\rho_{R23,soll}$) for the first positioning drive and the second control signal (A2) describes one or both of a second stator field reference angle ($\rho_{S26,soll}$) and a second rotor field reference angle ($\rho_{R26,soll}$) for the second positioning drive (26).

3. Positioning drive according to claim 2, wherein the first positioning drive controller (22) is set up to determine a first stepper signal (ST1) for the first positioning drive (23) from the first control signal (A1) and to transmit the first stepper signal (ST1) to the first positioning drive (23), in order to set for the first positioning drive (23) one or both of a first stator field actual angle ($\rho_{S23,ist}$) according to the first stator field reference angle ($\rho_{S23,soll}$) and a first rotor field actual angle ($\rho_{R23,ist}$) according to the first rotor field reference angle ($\rho_{R23,soll}$), and
   wherein the second positioning drive controller (25) is set up to determine a second stepper signal (ST2) for the second positioning drive (26) from the second control signal (A2) and to transmit the second stepper signal (ST2) to the second positioning drive (26), in order to set for the second positioning drive (26) one or both of a second stator field actual angle ($\rho_{S26,ist}$) according to the second stator field reference angle ($\rho_{S26,soll}$) and a second rotor field actual angle ($\rho_{R26,ist}$) according to the second rotor field reference angle ($\rho_{R26,soll}$).

4. Positioning drive according to claim 3, wherein the first positioning drive controller (22) is set up to determine a first string current for the first positioning drive (23) as a function of the first stator field reference angle ($\rho_{S23,soll}$), and
   wherein the second positioning drive controller (25) is set up to determine a second string current for the second positioning drive (26) as a function of the second stator field reference angle ($\rho_{S26,soll}$).

5. Positioning drive according to claim 4, wherein the first string current and the second string current have a same constant current amplitude value (ID).

6. Positioning drive according to claim 1, wherein the central unit (31) is set up to set the first control signal (A1, A2), in the tensioning state, such that the power take-off element (16) is set up to carry out a sub-step position change (SUB) with a position change amount that is smaller than a position change amount that the first positioning drive (23) can perform outside of the tensioning state, and
   wherein the central unit (31) is set up to set the second control signal (A2), in the tensioning state, such that the power takeoff element (16) is set up to carry out a sub-step position change (SUB) with a position change amount that is smaller than a position change amount that the second positioning drive (23) can perform outside of the tensioning state.

7. Positioning drive according to claim 6, wherein to carry out a sub-step position change (SUB), stator field actual angles ($\rho_{S23,ist}$, $\rho_{S26,ist}$) or stator actual angles ($\varphi_{S23,ist}$, $\varphi_{S26,ist}$) for the positioning drives (23, 26) are changed alternately.

8. Positioning drive according to claim 1, wherein the rotor field actual angle ($\rho_{R23,ist}$, $\rho_{R26,ist}$) is determined from a rotor actual angle ($\varphi_{R23,ist}$, $\varphi_{R26,ist}$) and a number of pole pairs ($pz_i$).

9. Positioning drive according to claim 1, wherein a load reference angle ($\lambda_{23,soll}$, $\lambda_{26,soll}$) corresponds at most to a maximal load angle ($\lambda_{max}$) predetermined for one of the first positioning drive (23) or the second positioning drive (26).

10. Positioning drive according to claim 1, wherein the coupling unit (18) is structured without a self-locking effect.

11. Positioning drive according to claim 1, wherein force coupling exists between the coupling inputs (19, 20) and between each coupling input (19, 20) and the coupling output (17).

12. Positioning drive according to claim 1, further comprising a sensor unit (27) in communication with at least one position sensor (28, 29, 30), wherein the sensor unit (27) is configured to generate at least one position signal (P1, P2, P3) that describes a position and/or a position change of the power take-off element (16).

13. Positioning drive according to claim 12, wherein the central unit (31) is set up to process the at least one position signal (P1, P2, P3) and establish a virtual sensor signal (PV1, PV2, PV3) as a function of a last received position signal (P1, P2, P3) and a change value that was determined.

14. Method for positioning of a power take-off element (16) using a positioning drive (15) having a mechanical coupling unit (18) that has a first coupling input (19), a second coupling input (20), and a coupling output (17), wherein the coupling output (17) is connected with the power take-off element (16), having a first positioning drive unit (21), which has a first positioning drive (23) connected with the first coupling input (19) and a first positioning drive controller (22), which is set up for controlling the first positioning drive (23), having a second positioning drive unit (24) that has a second positioning drive (26) drive-connected with the power take-off element (16) and a second positioning drive controller (25), which is set up for controlling the second positioning drive (26), and having a central unit (31), with the method comprising:
- transmitting a position reference signal (PS) and/or a tensioning reference signal (VS) to the central unit (31) or determining a position reference signal (PS) and/or a tensioning reference signal (VS) by the central unit (31),
- determining a first control signal (A1) for the first positioning drive controller (22) and a second control signal (A2) for the second positioning drive controller (25), as a function of the position reference signal (PS) and the tensioning reference signal (VS), by the central unit (31), to generate tensioning moments ($M_{23}$, $M_{26}$) in opposite directions, in each instance, in the two positioning drives (23, 26),
- transmitting the first control signal (A1) to the first positioning drive controller (22),
- transmitting the second control signal to the second positioning drive controller,
- controlling the first positioning drive (23) by the first positioning drive controller (22), as a function of the first control signal (A1) and controlling the second positioning drive (26) by the second positioning drive controller (25), as a function of the second control signal (A2), so that a tensioning state is generated in the coupling unit (17),
- measuring or estimating rotor field actual values for one or both of the first positioning drive (23) or the second positioning drive (26),
- using the measured or estimated rotor field actual values to calculate or estimate load angle actual values, and
- regulating load angle of the one or both of the first positioning drive (23) or the second positioning drive (26) based on the calculated or estimated load angle actual values.

15. Positioning drive (15) for positioning of a power take-off element (16), the drive comprising:
- a mechanical coupling unit (18) that has a first coupling input (19), a second coupling input (20), and a coupling output (17), wherein the coupling output (17) is connected with the power take-off element (16),
- a first positioning drive unit (21), which has a first positioning drive (23) connected with the first coupling input (19), and a first positioning drive controller (22) that is set up to control the first positioning drive (23),
- a second positioning drive unit (24), which has a second positioning drive (26) connected with the second coupling input (20), and a second positioning drive controller (25), which is set up to control the second positioning drive (26),
- a central unit (31), to which a kinematic reference value (PS) and a tensioning reference value (VS) can be provided, or in which a kinematic reference value (PS) and/or a tensioning reference value (VS) can be determined,
wherein the central unit (31) is set up to determine a first control signal (A1) for the first positioning drive controller (22) and a second control signal (A2) for the second positioning drive controller (25), as a function of the kinematic reference value (PS) and the tensioning reference value (VS),
wherein the first control signal (A1) and the second control signal (A2) are predetermined in such a manner to generate tensioning moments ($M_{23}$, $M_{26}$) in opposite directions in the two positioning drives (23, 26), when applied in each instance,
wherein the central unit (31) is set up to transmit the first control signal (A1) to the first positioning drive controller (22) and the second control signal (A2) to the second positioning drive controller (25),
and wherein the first positioning drive controller (22) is set up to control the first positioning drive (23) as a function of the first control signal (A1) and the second positioning drive controller (25) is set up to control the second positioning drive (26) as a function of the second control signal (A2), so that a tensioning state is generated in the coupling unit (18);
wherein the central unit (31) is set up to set the first control signal (A1, A2), in the tensioning state, such that the power take-off element (16) is set up to carry out a sub-step position change (SUB) with a position change amount that is smaller than a position change amount that the first positioning drive (23) can perform outside of the tensioning state, and
wherein the central unit (31) is set up to set the second control signal (A2), in the tensioning state, such that the power takeoff element (16) is set up to carry out a sub-step position change (SUB) with a position change amount that is smaller than a position change amount that the second positioning drive (23) can perform outside of the tensioning state;
wherein to carry out a sub-step position change (SUB), stator field actual angles ($\rho_{S23,ist}$, $\rho_{S26,ist}$) or stator actual angles ($\varphi_{S23,ist}$, $\varphi_{S26,ist}$) for the positioning drives (23, 26) are changed alternately.

16. Positioning drive (15) for positioning of a power take-off element (16), the drive comprising:
- a mechanical coupling unit (18) that has a first coupling input (19), a second coupling input (20), and a coupling output (17), wherein the coupling output (17) is connected with the power take-off element (16),
- a first positioning drive unit (21), which has a first positioning drive (23) connected with the first coupling input (19), and a first positioning drive controller (22) that is set up to control the first positioning drive (23), a second positioning drive unit (24), which has a second positioning drive (26) connected with the second coupling input (20), and a second positioning drive controller (25), which is set up to control the second positioning drive (26), a central unit (31), to which a kinematic reference value (PS) and a tensioning reference value (VS) can be provided, or in which a kinematic reference value (PS) and/or a tensioning reference value (VS) can be determined, wherein the central unit (31) is set up to determine a first control signal (A1) for the first positioning drive controller (22) and a second control signal (A2) for the second positioning drive controller (25), as a function of the kinematic reference value (PS) and the tensioning reference value (VS), wherein the first control signal (A1) and the second control signal (A2) are predetermined in such a manner to generate tensioning moments ($M_{23}$, $M_{26}$) in opposite directions in the two positioning drives (23, 26), when applied in each instance, wherein the central unit (31) is set up to transmit the first control signal (A1) to the first positioning drive controller (22) and the second control signal (A2) to the second positioning drive controller (25), and wherein the first positioning drive controller (22) is set up to control the first positioning drive (23) as a function of the first control signal (A1) and the second positioning drive controller (25) is set up to control the second positioning drive (26) as a function of the second control signal (A2), so that a tensioning state is generated in the coupling unit (18);

wherein the first control signal (A1) describes one or both of a first stator field reference angle ($\rho_{S23,soll}$) and a first rotor field reference angle ($\rho_{R23,soll}$) for the first positioning drive and the second control signal (A2) describes one or both of a second stator field reference angle ($\rho_{S26,soll}$) and a second rotor field reference angle ($\rho_{R26,soll}$) for the second positioning drive (26);

wherein the first positioning drive controller (22) is set up to determine a first stepper signal (ST1) for the first positioning drive (23) from the first control signal (A1) and to transmit the first stepper signal (ST1) to the first positioning drive (23), in order to set for the first positioning drive (23) one or both of a first stator field actual angle ($\rho_{S23,ist}$) according to the first stator field reference angle ($\rho_{S23,soll}$) and a first rotor field actual angle ($\rho_{R23,ist}$) according to the first rotor field reference angle ($\rho_{R23,soll}$), and wherein the second positioning drive controller (25) is set up to determine a second stepper signal (ST2) for the second positioning drive (26) from the second control signal (A2) and to transmit the second stepper signal (ST2) to the second positioning drive (26), in order to set for the second positioning drive (26) one or both of a second stator field actual angle ($\rho_{S26,ist}$) according to the second stator field reference angle ($\rho_{S26,soll}$) and a second rotor field actual angle ($\rho_{R26,ist}$) according to the second rotor field reference angle ($\rho_{R26,soll}$);

wherein the first positioning drive controller (22) is set up to determine a first string current for the first positioning drive (23) as a function of the first stator field reference angle ($\rho_{S23,soll}$), and wherein the second positioning drive controller (25) is set up to determine a second string current for the second positioning drive (26) as a function of the second stator field reference angle ($\rho_{S26,soll}$).

17. Positioning drive (15) for positioning of a power take-off element (16), the drive comprising:

a mechanical coupling unit (18) that has a first coupling input (19), a second coupling input (20), and a coupling output (17), wherein the coupling output (17) is connected with the power take-off element (16), a first positioning drive unit (21), which has a first positioning drive (23) connected with the first coupling input (19), and a first positioning drive controller (22) that is set up to control the first positioning drive (23), a second positioning drive unit (24), which has a second positioning drive (26) connected with the second coupling input (20), and a second positioning drive controller (25), which is set up to control the second positioning drive (26), a central unit (31), to which a kinematic reference value (PS) and a tensioning reference value (VS) can be provided, or in which a kinematic reference value (PS) and/or a tensioning reference value (VS) can be determined, wherein the central unit (31) is set up to determine a first control signal (A1) for the first positioning drive controller (22) and a second control signal (A2) for the second positioning drive controller (25), as a function of the kinematic reference value (PS) and the tensioning reference value (VS), wherein the first control signal (A1) and the second control signal (A2) are predetermined in such a manner to generate tensioning moments ($M_{23}$, $M_{26}$) in opposite directions in the two positioning drives (23, 26), when applied in each instance, wherein the central unit (31) is set up to transmit the first control signal (A1) to the first positioning drive controller (22) and the second control signal (A2) to the second positioning drive controller (25), and wherein the first positioning drive controller (22) is set up to control the first positioning drive (23) as a function of the first control signal (A1) and the second positioning drive controller (25) is set up to control the second positioning drive (26) as a function of the second control signal (A2), so that a tensioning state is generated in the coupling unit (18);

wherein the central unit (31) is further configured to measure or estimate rotor field actual values for one or both of the first positioning drive (23) or the second positioning drive (26), use the measured or estimated rotor field actual values to calculate or estimate load angle actual values, and effect regulation of load angle of the one or both of the first positioning drive (23) or the second positioning drive (26) based on the calculated or estimated load angle actual values.

18. Positioning drive according to claim 17, wherein both of the first positioning drive (23) and the second positioning drive (26), in the tensioning state, have a first load angle ($\lambda_{i,ist}$) that results from a difference between a rotor field reference angle ($\rho_{R23,soll}$, $\rho_{R26,soll}$) and a rotor field actual angle ($\rho_{R23,ist}$, $\rho_{R26,ist}$).

19. Positioning drive according to claim 18, wherein the rotor field actual angle ($\rho_{R23,ist}$, $\rho_{R26,ist}$) is determined from a rotor actual angle ($\varphi_{R23,ist}$, $\varphi_{R26,ist}$) and a number of pole pairs ($pz_i$).

20. Positioning drive according to claim 18, wherein a load reference angle ($\lambda_{23,soll}$, $\lambda_{26,soll}$) corresponds at most to a maximal load angle ($\lambda_{max}$) predetermined for one of the first positioning drive (23) or the second positioning drive (26).

21. Positioning drive according to claim 17, wherein the coupling unit (18) is structured without a self-locking effect.

22. Positioning drive according to claim 17, wherein force coupling exists between the coupling inputs (19, 20) and between each coupling input (19, 20) and the coupling output (17).

23. Positioning drive according to claim 17, further comprising a sensor unit (27) in communication with at least one position sensor (28, 29, 30), wherein the sensor unit (27) is configured to generate at least one position signal (P1, P2, P3) that describes a position and/or a position change of the power take-off element (16).

24. Positioning drive according to claim 23, wherein the central unit (31) is set up to process the at least one position signal (P1, P2, P3) and establish a virtual sensor signal (PV1, PV2, PV3) as a function of a last received position signal (P1, P2, P3) and a change value that was determined.

* * * * *